(12) United States Patent
DeVries

(10) Patent No.: US 9,884,730 B2
(45) Date of Patent: Feb. 6, 2018

(54) APPARATUS AND METHOD FOR TRACKING CONVEYOR BELTS

(71) Applicant: Flexible Steel Lacing Company, Downers Grove, IL (US)

(72) Inventor: Brett E. DeVries, Comstock Park, MI (US)

(73) Assignee: Flexible Steel Lacing Company, Downers Grove, IL (US)

(*) Notice: Subject to any disclaimer, the term of this patent is extended or adjusted under 35 U.S.C. 154(b) by 0 days.

(21) Appl. No.: 15/349,435

(22) Filed: Nov. 11, 2016

(65) Prior Publication Data
US 2017/0137229 A1 May 18, 2017

Related U.S. Application Data

(60) Provisional application No. 62/254,523, filed on Nov. 12, 2015.

(51) Int. Cl.
*B65G 39/16* (2006.01)
*B65G 15/64* (2006.01)

(52) U.S. Cl.
CPC ............. *B65G 39/16* (2013.01); *B65G 15/64* (2013.01)

(58) Field of Classification Search
CPC ................................ B65G 15/64; B65G 39/19
USPC ......................................................... 198/806
See application file for complete search history.

(56) References Cited

U.S. PATENT DOCUMENTS

| | | | |
|---|---|---|---|
| 1,833,180 A * | 11/1931 | Robins | B65G 39/071 193/36 |
| 2,160,057 A | 5/1939 | Carus et al. | |
| 2,225,276 A | 12/1940 | Parker | |
| 2,256,685 A | 9/1941 | Parker | |
| 2,330,923 A | 10/1943 | Robins | |

(Continued)

FOREIGN PATENT DOCUMENTS

| | | |
|---|---|---|
| AU | 658110 | 1/1995 |
| CH | 686507 A5 | 4/1996 |

(Continued)

OTHER PUBLICATIONS

"Persuader PT Max and PT Smart Belt Trainers" issued by Flexible Steel Lacing Company, Jul. 2000 (2 pages).

(Continued)

*Primary Examiner* — Mark A Deuble
(74) *Attorney, Agent, or Firm* — Fitch, Even, Tabin & Flannery LLP

(57) ABSTRACT

A tracking apparatus and method for urging a mistracking conveyor belt towards a correct travel path are disclosed. The apparatus and method utilize downstream shifting of an end portion of an idler roller due to mistracking of the conveyor belt for steering the belt back toward its correct travel path and a reaction force from the belt due to the steering thereof for energizing a tilting action of the idler roller to raise the downstream end portion thereof. The idler roller is mounted to the conveyor structure via a frame assembly including a tilt device mounted internally within the idler roller. The roller is rotatably mounted to an inner tube, and the inner tube member is pivotally mounted to the tilt device, which in combination allow the idler roller to pivot, shift, and tilt to steer a mistracking conveyor belt in relative proportion to degree of mistracking of the belt.

24 Claims, 18 Drawing Sheets

(56) References Cited

U.S. PATENT DOCUMENTS

| | | | |
|---|---|---|---|
| 2,653,700 | A | 9/1953 | Sloane |
| 2,725,757 | A | 12/1955 | Murphy |
| 2,815,851 | A | 12/1957 | Yoshimura |
| 3,001,680 | A | 9/1961 | Nitkiewicz |
| 3,066,547 | A | 12/1962 | Evans et al. |
| 3,240,321 | A | 3/1966 | Lo Presti et al. |
| 3,368,665 | A | 2/1968 | Jinkins |
| 3,593,841 | A | 7/1971 | Leow |
| 3,596,817 | A | 8/1971 | Morse et al. |
| 3,603,451 | A | 9/1971 | Promin et al. |
| 3,621,728 | A | 11/1971 | Steorts, Jr. |
| 4,196,803 | A * | 4/1980 | Lovett ............... B65G 39/071 198/806 |
| 5,358,098 | A | 10/1994 | Sundstrom et al. |
| 5,609,241 | A | 3/1997 | Shaw |
| 5,911,304 | A | 6/1999 | Cumberlege |
| 5,950,806 | A | 9/1999 | Warneke |
| 6,053,478 | A * | 4/2000 | Friedman ........ H01L 21/68792 212/274 |
| 6,116,410 | A | 9/2000 | Malmberg |
| 6,131,726 | A | 10/2000 | Hovsto et al. |
| 6,173,830 | B1 | 1/2001 | Cumberlege et al. |
| 6,241,078 | B1 | 6/2001 | Mott |
| 6,390,287 | B2 * | 5/2002 | Riffe .................. B65G 39/125 198/806 |
| 6,405,854 | B1 | 6/2002 | Cumberlege |
| 6,431,348 | B2 | 8/2002 | Malmberg |
| 7,051,967 | B2 | 5/2006 | Kitajima |
| 7,614,493 | B2 | 11/2009 | Dowling et al. |
| 7,669,709 | B2 | 3/2010 | Hovsto et al. |
| 7,806,253 | B2 * | 10/2010 | Graswinckel ........ G03G 15/755 198/806 |
| 7,967,129 | B2 | 6/2011 | Swinderman |
| 8,556,068 | B2 | 10/2013 | Devries |
| 9,346,622 | B2 | 5/2016 | Kuiper et al. |
| 2001/0023815 | A1 | 9/2001 | Mott |
| 2001/0040086 | A1 | 11/2001 | Riffe |
| 2003/0015394 | A1 | 1/2003 | Nimmo et al. |
| 2006/0027444 | A1 | 2/2006 | Donnenhoffer |
| 2006/0076217 | A1 | 4/2006 | Cumberlege |
| 2009/0178901 | A1 | 7/2009 | Hovsto et al. |
| 2010/0116626 | A1 | 5/2010 | Felton |
| 2011/0272250 | A1 | 11/2011 | Devries |
| 2013/0284565 | A1 | 10/2013 | Kuiper et al. |

FOREIGN PATENT DOCUMENTS

| | | |
|---|---|---|
| FR | 2586235 A1 | 2/1987 |
| GB | 608907 | 9/1948 |
| WO | 9741051 A1 | 11/1997 |
| WO | 2009016484 A1 | 2/2009 |
| WO | 2011005091 A2 | 1/2011 |

OTHER PUBLICATIONS

"Persuader PT Max Belt Trainer" issued by Flexible Steel Lacing Company, Aug. 2001 (2 pages).

"Persuader PT Smart Belt Trainer Instructions for Installation" issued by Flexible Steel Lacing Company, Feb. 2001 (4 pages).

"Persuader Trainers and Positioners Selection Guidelines" issued by Flexible Steel Lacing Company, Feb. 2001 (2 pages).

"PT Max Belt Trainer Top Side and Return Side Instructions for Installation" issued by Flexible Steel Lacing Company, Jul. 2008 (4 pages).

"PT Max Belt Trainers" issued by Flexible Steel Lacing Company, Feb. 2008 (2 pages).

"PT Max Belt Trainers" issued by Flexible Steel Lacing Company, Jun. 2011 (2 pages).

"PT Max Return Side Data Sheet" issued by Flexible Steel Lacing Company, Jun. 2009 (1 page).

"PT Max Roller Data Sheet" issued by Flexible Steel Lacing Company, Jun. 2009 (1 page).

"PT Max Top Side Data Sheet" issued by Flexible Steel Lacing Company, Jun. 2009 (1 page).

"PT Max V-Return Side Data Sheet" issued by Flexible Steel Lacing Company, Jun. 2009 (1 page).

Notification of Transmittal of the International Search Report and the Written Opinion of the International Searching Authority, or the Declaration from the International Bureau of WIPO for related International Application No. PCT/US13/30034, dated Apr. 8, 2014, 15 pages.

Patent Examination Report No. 1 issued in related Australian Application No. 2013203168, dated Sep. 23, 2014, 6 pages.

Notification of Transmittal of the International Search Report and the Written Opinion of the International Searching Authority, or the Declaration from the International Bureau of WIPO for International Application No. PCT/US16/61531, dated Feb. 16, 2017, 14 pages.

* cited by examiner

APPARATUS AND METHOD FOR TRACKING CONVEYOR BELTS

CROSS REFERENCE TO RELATED APPLICATION

This application claims the benefit of U.S. Provisional Application No. 62/254,523, entitled "Apparatus and Method for Tracking Conveyor Belts", filed Nov. 12, 2015, which is hereby incorporated by reference in its entirety.

FIELD OF THE INVENTION

The invention relates to tracking apparatuses and methods for tracking conveyor belts.

BACKGROUND OF THE INVENTION

Rollers for conveyor belts are arranged so that the conveyor belt travels thereover in a downstream belt travel direction and path. However, conveyor belts can tend to meander or mistrack laterally toward one side or the other of the rollers due to reasons such as uneven loads carried by the belt. Conveyor belt tracking devices have been developed that respond to belt mistracking to attempt to redirect the belt back to its correct travel path substantially centered on the conveyor rollers.

One type of belt tracking device configured to correct a misaligned belt has sensor rollers that are mounted to arms that are each operatively connected to a frame for tracking or training rollers under a belt. If the belt becomes misaligned, it will forcefully engage the sensor roller at the misaligned side, which will cause the arms to force the belt training roller to pivot for steering the belt back toward its proper downstream travel path. However, the sensor rollers are generally located upstream or downstream of the training rollers to create the necessary moment arm for pivoting the rollers. This upstream or downstream mounting of the sensor rollers means that the correcting mechanism is limited to use when the belt travels in a single direction. Furthermore, this solution requires the edge of the belt to forcefully make contact with the sensor rollers, which can undesirably damage the belt.

One type of belt tracker that avoids the use of sensor rollers is disclosed in U.S. Pat. No. 6,405,854 to Cumberlege. The Cumberlege system includes a pair of rollers mounted to an elongate support shaft that is pivotable about its center relative to a support frame. The shaft includes a vertical post that pivots within a cylindrical bushing mounted to the support frame. The rollers include an outwardly decreasing taper at the outer ends, which operate to cause the rollers mounted to the elongate shaft to pivot in a horizontal plane about the vertical axis to steer a misaligned belt back toward its proper downstream travel path. The rollers can be mounted to the shaft either in a trough configuration or in a non-troughed or flat configuration. In the troughed configuration, the rollers pivot about the vertical axis while maintaining their orientation relative to the vertical pivot axis. This configuration is limited, however, because the disclosed system is not capable of tilting or raising an outer end of the roller to provide additional steering control over a mistracking belt.

Another belt tracking device that avoids the use of sensor rollers has an inclined pivot axis of the rollers located upstream of the rollers. This belt tracker is disclosed in U.S. Pat. No. 2,225,276 to Parker and includes an idler roller that is pivotal about a pivot axis that is upwardly inclined in the downstream direction. In this regard, when a conveyor belt mistracks toward one end portion of the idler roller, the drag forces acting downstream on the idler roller end portion increase, urging the end portion to shift downstream, while the downstream tilt of the pivot axis causes the idler roller end portion to also simultaneously shift downwardly under the increased weight of the mistracked belt passing over the end portion. Thus Parker's belt tracker utilizes the weight of the conveyor belt and drag forces acting on the end portion toward which the belt is mistracking to energize the idler roller to pivot about the pivot axis. However, the Parker belt tracker is limited because the tilt of the pivot axis restricts its use to belts that travel in a single direction.

A belt tracking apparatus is disclosed in U.S. Patent Application Publication No. 2011/0272250 assigned to the Applicant herein. The belt tracking apparatus has an inclined pivot axis. However, the pivot axis is located downstream of the idler tracking roller so that when the tracking roller pivots about the included pivot axis, the one end portion of the roller that shifts downstream will also simultaneously shift upwardly for urging the mistracking belt back toward its correct travel path. The belt tracking apparatus of the '250 publication also relies on engagement between an edge of the belt and the corresponding one of the sensor rollers to generate the energizing force for pivoting the tracking roller so that its end portion is shifted downstream and upwardly. Further, because the tracking roller pivots about an inclined pivot axis, shifting of the roller end portion upwardly will be dictated by the angle of the inclination of the pivot axis and the amount of downstream shifting of the roller end portion. In other words, the inclination of the pivot axis defines a predefined relationship between the amount of downstream shifting of the tracking roller end portion and the amount of upward shifting thereof when the tracking roller is pivoted for correcting a mistracking conveyor belt. This can require that greater energizing force be generated from the sensor roller for actuating the pivoting of the tracking roller since it simultaneously has its end portion shifted both downstream and upwardly. In addition, the use of sensor rollers and an inclined pivot axis restricts use of the '250 publication tracking apparatus to conveyor belts that travel in a single direction.

Another known belt tracking apparatus is disclosed in U.S. Patent Application Publication No. 2013/0284565 assigned to the Applicant herein. The disclosed apparatus includes a support frame for mounting the apparatus to the conveyor belt system, a tilt channel device mounted to the support frame so that the tilt channel device can shift laterally and tilt relative to the support frame, and a roller assembly mounted to the tilt channel device so as to be rotatable and pivotable. Accordingly, the frame assembly is configured to allow the reaction force from the conveyor belt caused by the downstream shifting of an end portion of an idler roller due to mistracking of the conveyor belt for directing or steering the belt back toward its correct travel path to be used for energizing a tilting action of the idler roller to raise the downstream end portion thereof.

SUMMARY

A tracking apparatus and method for urging a mistracking conveyor belt back towards a correct travel path are provided. The apparatus and method both utilize downstream shifting of an end portion of an idler roller due to mistracking of the conveyor belt for directing or steering the belt back toward its correct travel path and a reaction force from the belt due to the steering thereof for energizing a tilting action of the idler roller to raise the downstream end portion thereof. In this manner, the tilting of the idler roller is not mechanically coupled to the downstream shifting of the roller end portion since it is the steering action that first generates the reaction force in the belt against the shifted idler roller which is used as the actuation or energizing force for tilting the idler roller. By mechanically separating the downstream shifting and tilting actions of the roller, an inclined pivot axis for the idler roller such as provided in prior belt tracking devices is avoided allowing the belt tracking apparatus herein to be bi-directional for use with conveyor belts that may be run in opposite travel directions.

Also, the energizing force for tilting the idler roller is independent of the energizing force for downstream shifting of the idler roller end portion thus allowing the tracking apparatus to generate an amount of tilting of the idler roller that is in proportion to the resistance of the belt being steered by the shifted idler roller. In other words, if the belt provides little resistance to being steered back toward its correct travel path by the shifted idler roller, then the idler roller will not be tilted to the same degree as when there is greater resistance by the mistracking belt to the steering action. In this instance, the tilting of the idler roller will be greater so that the tilted idler roller creates another influence on the mistracking belt, in addition to the steering action, that will urge the belt back towards its correct travel path.

In one aspect, a tracking apparatus is provided that includes an idler roller for supporting the conveyor belt and a frame assembly that is configured to operatively mount the idler roller to conveyor structure. The frame assembly is further configured to allow the idler roller to shift when the conveyor belt is mistracking so that one end portion of the idler roller is further downstream than the other end portion thereof for directing the belt back toward the correct travel path. The frame assembly is also configured to allow the idler roller to use a reaction force from the belt as the belt is being directed by the shifted idler roller to actuate the idler roller to be tilted for urging the belt back toward the correct travel path. Rather than defining a predetermined relationship between the amount of downstream shifting of the idler roller and the amount of upward shifting thereof as in prior tracking apparatuses, the tracking apparatus herein utilizes a reaction force from the belt as it is being directed by the idler roller that is shifted to have one of its end portions further downstream than the other end portion as the actuation force for tilting the idler roller for urging the belt back toward the correct travel path. In this manner, the tilting action of the idler roller is in proportion to the amount of resistance generated by the belt to the steering action undertaken by the shifted idler roller. In particular, the end portion of the tilted idler roller has been shifted in a direction transverse to the surface of the conveyor belt, e.g. raised upwardly into the belt when the idler roller is installed underneath the conveyor belt, so as to increase the force exerted by the idler roller end portion on the engaged surface of the belt.

In another form, the tracking apparatus includes an idler roller having opposite end portions and a neutral position when the conveyor belt is traveling along the correct travel path, a central support shaft configured to operatively mount the idler roller to conveyor structure with the central support shaft extending along a longitudinal axis transverse to the correct travel path of the conveyor belt, and a tilt coupling operably connected between the central support shaft and to the idler roller with the tilt coupling disposed entirely within the idler roller. The tilt coupling is configured to allow the idler roller to pivot with respect to the central support shaft when the conveyor belt is mistracking so that one of the end portions of the idler roller is further downstream from the neutral position thereof and further downstream than the other end portion of the idler roller for directing the conveyor belt back toward the correct travel path. The tilt coupling also allows the idler roller to use a reaction force from the conveyor belt as the conveyor belt is being directed by the pivoted idler roller to actuate the idler roller to be tilted so that the one end portion of the idler roller is shifted in a direction transverse to the surface of the conveyor belt so as to increase the force exerted by the idler roller end portion on the conveyor belt surface for urging the conveyor belt back toward the correct travel path. In one form, the tilt coupling allows for tilting of the idler roller only as a result of the pivoting of the idler roller, but tilting does not occur with the idler roller in the neutral position thereof. The tilt coupling is configured for shifting of the idler roller along the longitudinal axis of the central support shaft, such as via one or more rollers between the tilt coupling and the central support shaft, and causes the idler roller to tilt when the idler roller is shifted along the longitudinal axis of the central support shaft. The tilt coupling has a central throughopening and the central support shaft extends through the central throughopening with the tilt coupling mounted thereto. The idler roller of the tracking apparatus is configured to urge the mistracking conveyor belt back toward a correct travel path without the use of sensor or edge rollers, and regardless of whether the conveyor belt is traveling in one direction or an opposite direction. In addition, the idler roller may be operably connected to the tilt coupling via a pivot connection having a pivot axis extending through the tilt coupling and about which the idler roller rotates. The idler roller may be connected to the tilt coupling via an inner tube member that is pivotally connected to the tilt coupling via the pivot connection, with the idler roller rotatably mounted about the inner tube member such that the idler roller is configured for simultaneous rotation and pivoting about the tilt coupling.

In another aspect, a bi-directional, self-energizing tracking apparatus for redirecting a mistracking conveyor belt back toward a correct travel path whether the conveyor belt is traveling in one direction or in an opposite direction is provided. The tracking apparatus includes an idler roller that engages a surface of the conveyor belt and a frame assembly for operatively mounting the idler roller to conveyor structure. A shiftable connection of the frame assembly for operably connecting the idler roller to the frame assembly is provided that is internal to the idler roller for shifting the idler roller relative to the frame assembly in response to the mistracking conveyor belt. The shiftable connection is configured to allow the idler roller to pivot about a pivot axis such that an end of the idler roller is shifted downstream relative to a neutral position thereof corresponding to the conveyor belt traveling along a correct travel path, and allows the idler roller to tilt such that the downstream end of the idler roller is shifted in a direction transverse to the surface of the conveyor belt so as to increase the force exerted by the idler roller end on the conveyor belt surface for guiding the mistracking conveyor belt back toward a correct travel path.

The shiftable connection may be configured to allow the idler roller to translate along a translation axis transverse to the one conveyor belt direction and to tilt the idler roller when the idler roller translates along the translation axis. In some forms, the shiftable connection is configured to pivot the idler roller about the pivot axis prior to tilting the idler roller such that in operation the idler roller only tilts when the idler roller is pivoted. The shiftable connection may take the form of a tilt coupling that is shiftably mounted about a central support shaft of the frame assembly for allowing the idler roller to tilt with respect to the central support shaft. An inner tube member may be pivotally mounted to the tilt coupling, with the idler roller rotatably mounted about the inner tube member such that the idler roller is configured to simultaneously rotate and pivot about the tilt coupling. The tilt coupling can be configured for translation laterally along the central support shaft, and the tilt coupling and the central support shaft have stops therebetween to limit lateral translation and tilting of tilt coupling relative to the central support shaft by a predetermined amount. Sealing members may be provided at either end of the idler roller for keeping debris or foreign materials from fouling the shiftable connection disposed within the idler roller.

In one form, the tracking apparatus has an outer idler roller that supports the conveyor belt and a frame assembly including a tilt device mounted to a central support shaft and about which the outer idler roller is mounted to allow the outer idler roller and tilt device to shift relative to the central support shaft. The outer idler roller includes lateral end portions that taper down toward a reduced diameter end thereof to cause the idler roller and tilt device to shift relative to the central support shaft so that one end of the outer idler roller is further downstream than the other end when the conveyor belt mistracks toward the one end for steering the conveyor belt back toward the correct travel path. The central support shaft extends across the conveyor belt and is operatively configured to be mounted to conveyor structure along the outer side portions of the conveyor belt. The tilt device tilts the outer idler roller with respect to the central support shaft as the outer idler roller receives a reaction force from the conveyor belt when the idler roller and tilt device are shifted for steering of the mistracking conveyor belt so that the idler roller is tilted and the downstream idler roller end is raised relative to the other idler roller end to urge the conveyor belt towards the correct travel path.

The self-energizing tracking apparatus does not rely on sensor rollers for generating either the actuation or energizing force for shifting of the idler roller for steering the conveyor belt back towards the correct travel path or for tilting of the idler roller for urging the conveyor belt back towards the correct travel path. Instead, it is the frictional engagement of the mistracking conveyor belt with the tapered end of the idler roller that generates the actuation force for shifting thereof when the belt mistracks. When the idler roller is shifted for steering the mistracking conveyor belt, a reaction force from the conveyor belt is received by the idler roller, which is used as the actuation force for causing the tilt device to tilt the idler roller relative to the central support shaft. In this manner, the idler roller end is also raised so that in addition to being steered back toward the correct travel path, the idler roller is tilted to urge the conveyor belt back toward the correct travel path. Since the tracking apparatus does not need to employ sensor rollers for generating its energizing or actuation forces for shifting and tilting the idler roller, the tracking apparatus is bi-directional in that it can be used without being reconfigured for correcting the travel path of the belt whether it is traveling in one direction or in a direction opposite to the one direction.

In one form, the tilt device takes the form of a tilt coupling about which the idler roller is rotatably connected to allow the idler roller to rotate relative to the tilt coupling. The rotatable connection can be in the form of one or more roller bearing assemblies between an inner tube and the outer roller that allows the roller to rotate relative to the tilt device. The inner tube is also pivotally mounted to the tilt coupling at a pivot connection so that the inner tube and idler roller may pivot about the tilt coupling about a pivot axis that is orthogonal to the rotational axis of the idler roller. The tilt coupling is translateably mounted to the central support shaft via rollers that allow the tilt coupling to roll therealong to provide low friction support to the tilt coupling as it shifts relative to the central support shaft and as the tilt coupling tilts along with the idler roller. Accordingly, via the roller's rotatable connection with the inner tube, the inner tube's pivotal connection with the tilt coupling, and the tilt coupling's translatable and tiltable connection with the central support shaft, the idler roller is capable of complex and polyaxial shifting energized solely by the belt to correct the travel path of the belt. Advantageously, all of the moveable connections between the idler roller and the support shaft are internal to the idler roller, resulting in a significantly lighter, mechanically simplified tracking apparatus with fewer parts that is efficient to produce, and offers simplified installation and maintenance. In addition, because the moving parts of the frame assembly are internal to the roller, the moving parts are advantageously protected from the elements and from debris or other foreign material, offering improved reliability and performance.

In another aspect, a method for urging a mistracking conveyor belt back toward a correct travel path is provided including mounting an idler roller disposed about a central support shaft to conveyor structure such that the idler roller is operably supported by the central support shaft extending through the idler roller and is configured to rotate about the central support shaft, as well as pivot and tilt with respect thereto, the idler roller having outer end portions adjacent outer side surface portions of the conveyor belt, pivoting the idler roller with respect to the central support shaft so that one end portion of the idler roller is further downstream than the other end portion in response to conveyor belt mistracking toward the one end portion of the idler roller, steering the conveyor belt back toward the correct travel path with the pivoted idler roller. The method further includes causing the idler roller to undergo a tilting action with respect to the central support shaft so that the idler roller end portion that has been shifted downstream shifts in a direction transverse to the corresponding outer side surface portion of the conveyor belt so as to increase the force exerted by the idler roller end portion on the corresponding outer side surface portion of the conveyor belt in response to a reaction force exerted by the conveyor belt being steered by the idler roller, and urging the conveyor belt to generally shift in a lateral direction away from the transversely shifted downstream idler roller end portion back toward the correct travel path due to the tilting of the idler roller. Causing the idler roller to undergo a tilting action may include shifting the idler roller along a longitudinal axis of the central support shaft. In one form, mounting the idler roller includes securing the central support shaft to the conveyor structure such that the central support shaft is fixed to the conveyor structure so as to remain stationary. The central support shaft in some forms may be mounted to the conveyor structure with the central support shaft between an upper carry run and a lower return run of the conveyor belt. The tracking apparatus is configured to urge the conveyor belt to generally shift in a lateral direction away from the transversely shifted downstream idler roller end portion back toward the correct travel path due to the tilting of the idler roller with the belt traveling in a second direction opposite from a first direction such that the idler roller urges a mistracking conveyor belt back toward a correct travel path regardless of whether the belt is traveling in the first or second directions.

In another form, a method for urging a mistracking conveyor belt back toward a correct travel path includes positioning an idler roller having tapered outer end portions under outer side portions of the conveyor belt, shifting the idler roller so that one of the idler roller outer end portions is further downstream than the other outer end portion in response to conveyor belt mistracking toward the one idler roller due to greater engagement of the corresponding belt outer side portion with the tapered outer end portion of the idler roller, steering the conveyor belt back toward the correct travel path with the shifted idler roller, tilting the idler roller by tilting a tilt device internal to the idler roller so that the outer end portion that has been shifted downstream is raised relative to the other end in response to a reaction force received from the conveyor belt being steered by the idler roller, and urging the conveyor belt to generally shift in a lateral direction away from the raised outer end portion back towards the correct travel path due to the tilting of the idler roller.

DETAILED DESCRIPTION OF THE PREFERRED EMBODIMENTS

Figure 1:
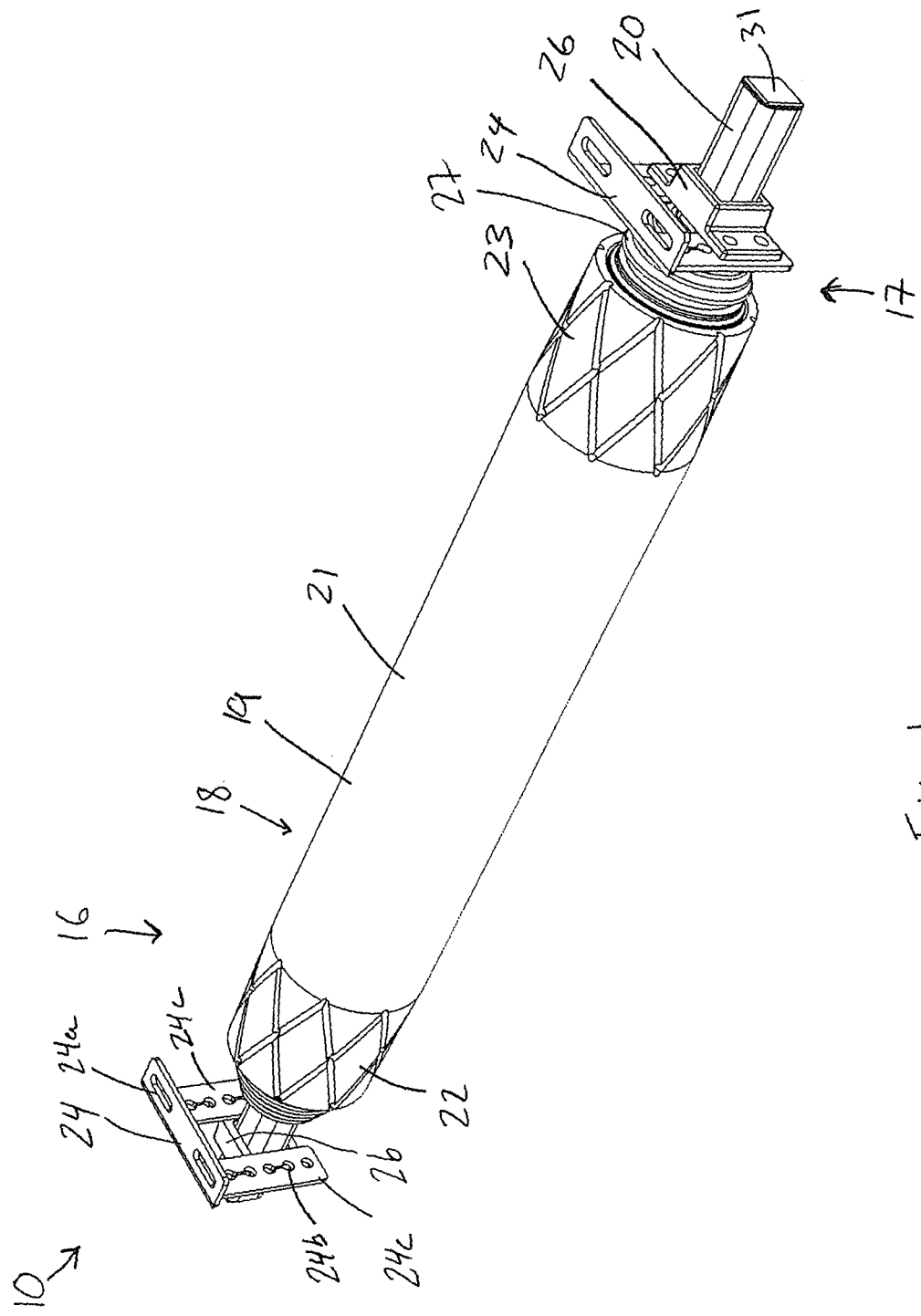
FIG. 1 is a perspective view of a belt tracking apparatus in accordance with the present invention.
Figure 2:
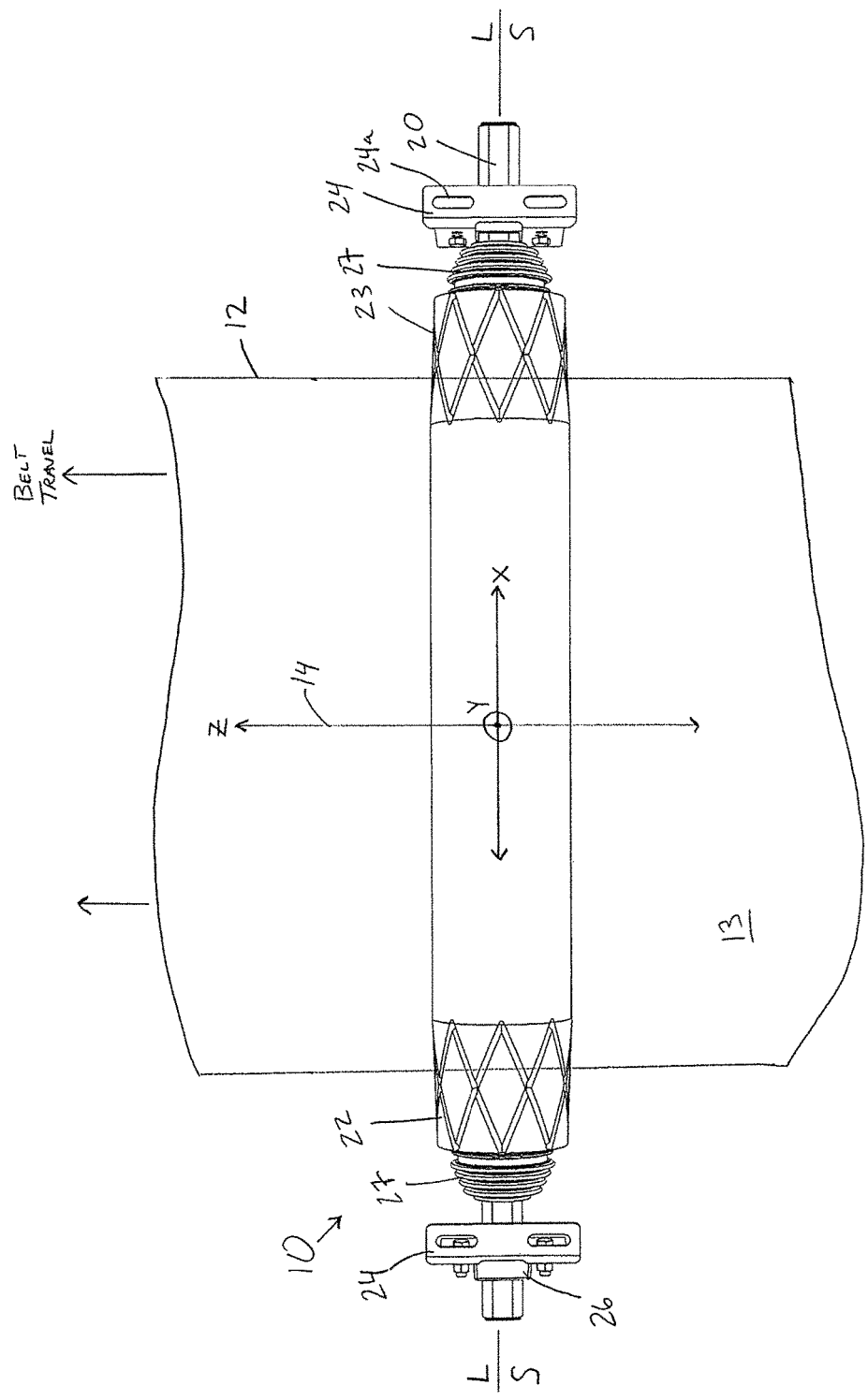
FIG. 2 is a plan view of the belt tracking apparatus of FIG. 1 showing the apparatus in a neutral position with the roller extending laterally orthogonal to the belt travel direction.

As illustrated in FIGS. 1-14, a conveyor belt tracking apparatus 10 is adapted to be used with an endless conveyor belt system positioned under a conveyor belt 12 thereof to track the belt 12 along a generally longitudinal belt travel path, the center line 14 of which is indicated at the Z axis in FIG. 2. To this end, the belt tracking apparatus 10 will be described with respect to correcting lateral misalignment of the belt 12 relative to the center line 14. The belt tracking apparatus 10 is generally symmetrical such that the structure and function of the apparatus 10 on one lateral side will be applicable to the opposite side as well.

Figure 3:
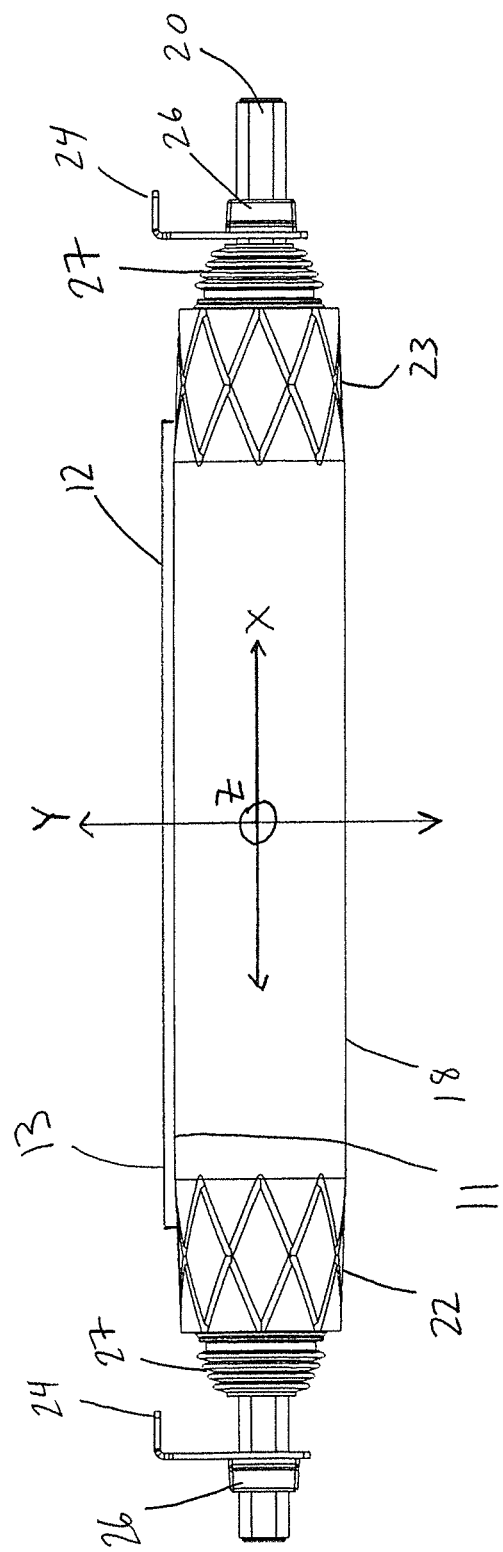
FIG. 3 is a front view of the belt tracking apparatus of FIG. 1 in the neutral position.
Figure 4:
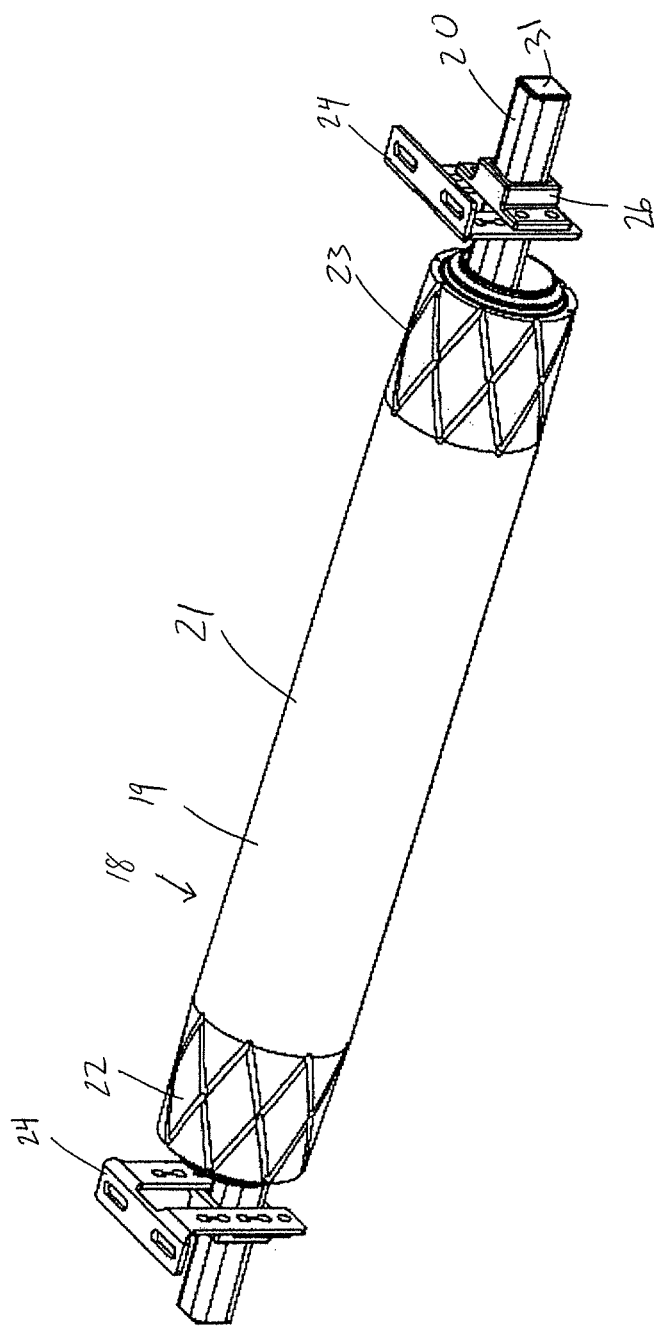
FIG. 4 is perspective view of the belt tracking apparatus of FIG. 1 showing the apparatus in a shifted and tilted orientation for redirecting a mistracking belt in contact therewith.

As shown in FIGS. 1-3, the belt tracking apparatus 10 includes a roller assembly 16 having a roller 18 being mounted for rotation about its longitudinal axis L to a frame assembly 17 including an elongate central support shaft 20 extending through the roller 18 about which the roller 18 rotates. The roller 18 has a symmetrical configuration with a cylindrical main portion 21 and tapered outer or lateral end portions 22, 23. The tapered outer end portions 22, 23 have an outwardly decreasing diameter relative to the main portion 21. In the disclosed embodiment, the roller 18 is comprised of an outer cover 19 made of urethane mounted about an outer roller tube 25, shown in FIG. 7. The outer cover 19 includes the tapered outer end portions 22, 23 and is configured to be replaceable due to wear caused by friction with the belt 12. In other forms, the outer cover 19 and outer roller tube 25 could be one integral piece.

The frame assembly 17 is configured to operatively mount the roller 18 to the conveyor structure (not shown) and to allow the roller 18 to shift when the conveyor belt 12 is mistracking so that one of the end portions 22, 23 of the roller 18 is further downstream from a neutral position (shown in FIG. 2) than the other end portion 23, 22 to direct the belt 12 back toward the correct travel path. The frame assembly 17 is further configured to allow the roller 18 to use a reaction force from the belt 12 as the belt is being directed by the shifted roller 18 to actuate the roller 18 to be tilted so that the one end portion 22, 23 shifted downstream is also raised upwardly relative to the neutral position to further urge the belt 12 back to the correct travel path. The tilting and raising up of the roller end portion 22, 23 only occurs as a result of the downstream shifting of the one end portion 22, 23, but does not occur with the roller 18 in the neutral position.

Figure 5:
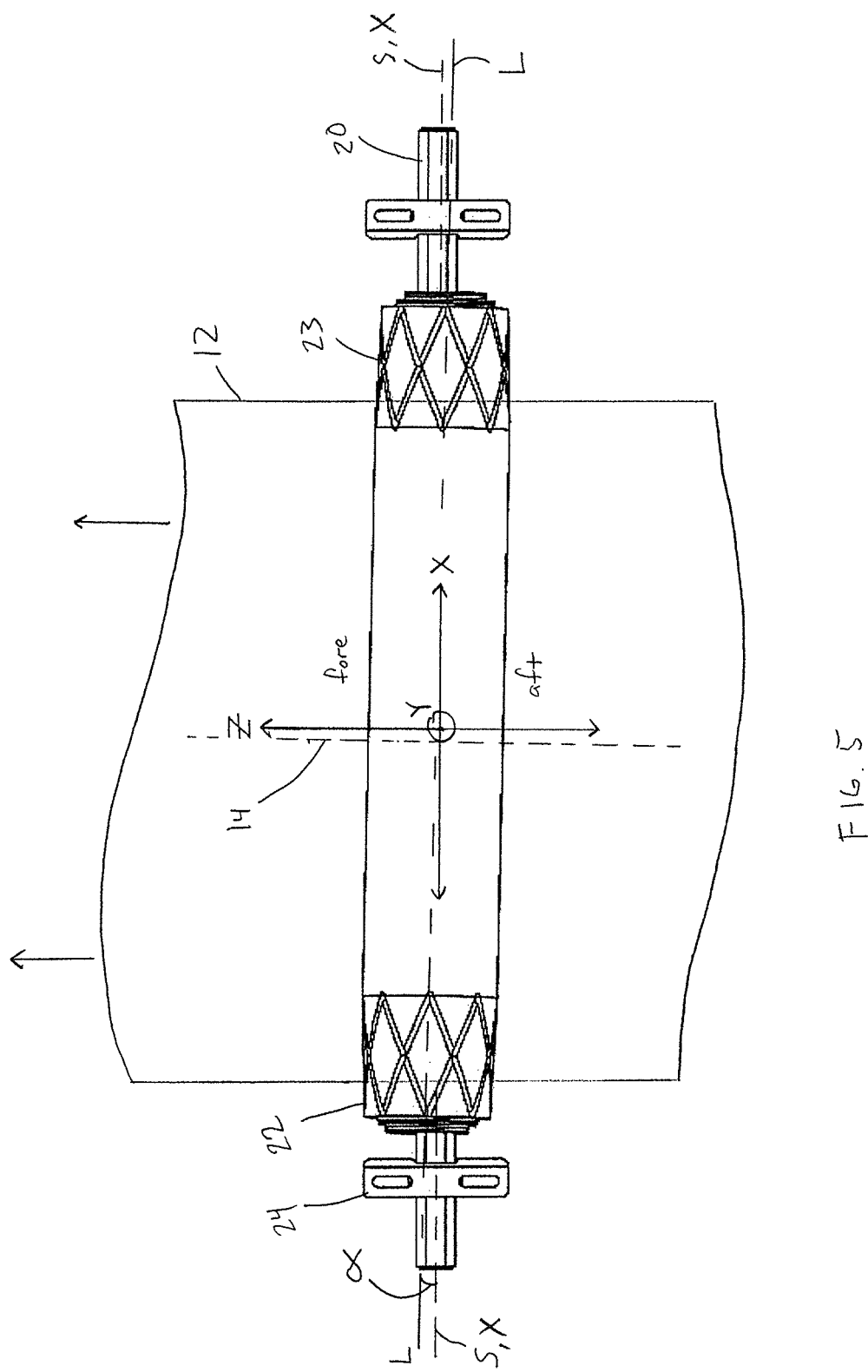
FIG. 5 is a plan view of the belt tracking apparatus of FIG. 1 showing the apparatus in a shifted and tilted orientation with the roller extending transversely and laterally non-orthogonally or obliquely to the belt travel direction.
Figure 6:
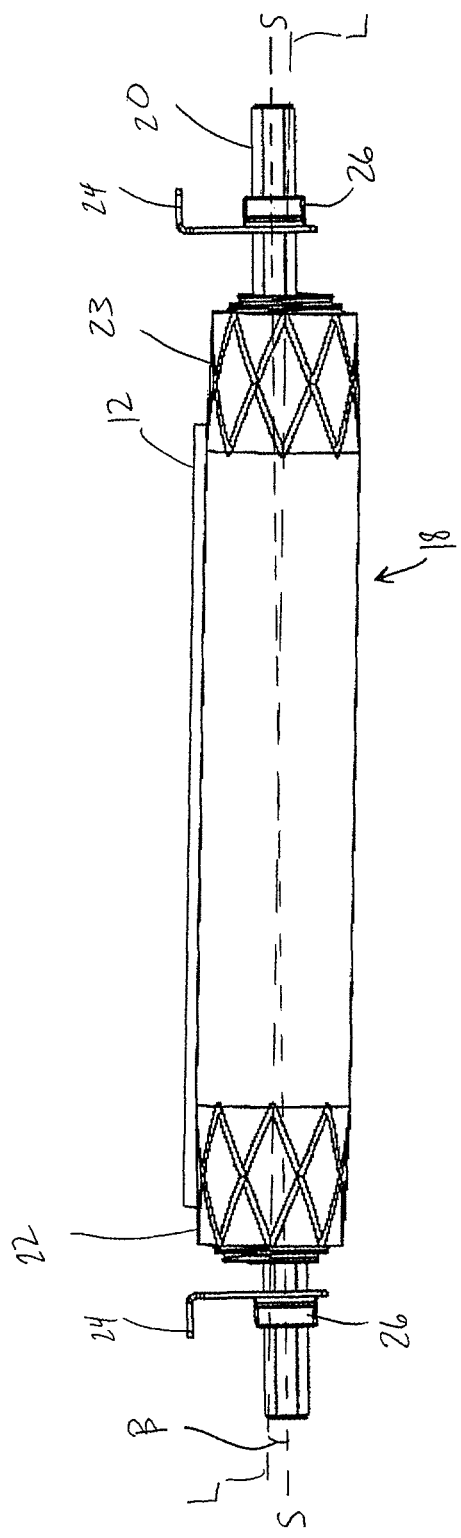
FIG. 6 is a front view of the belt tracking apparatus in the shifted and tilted orientation.
Figure 7:
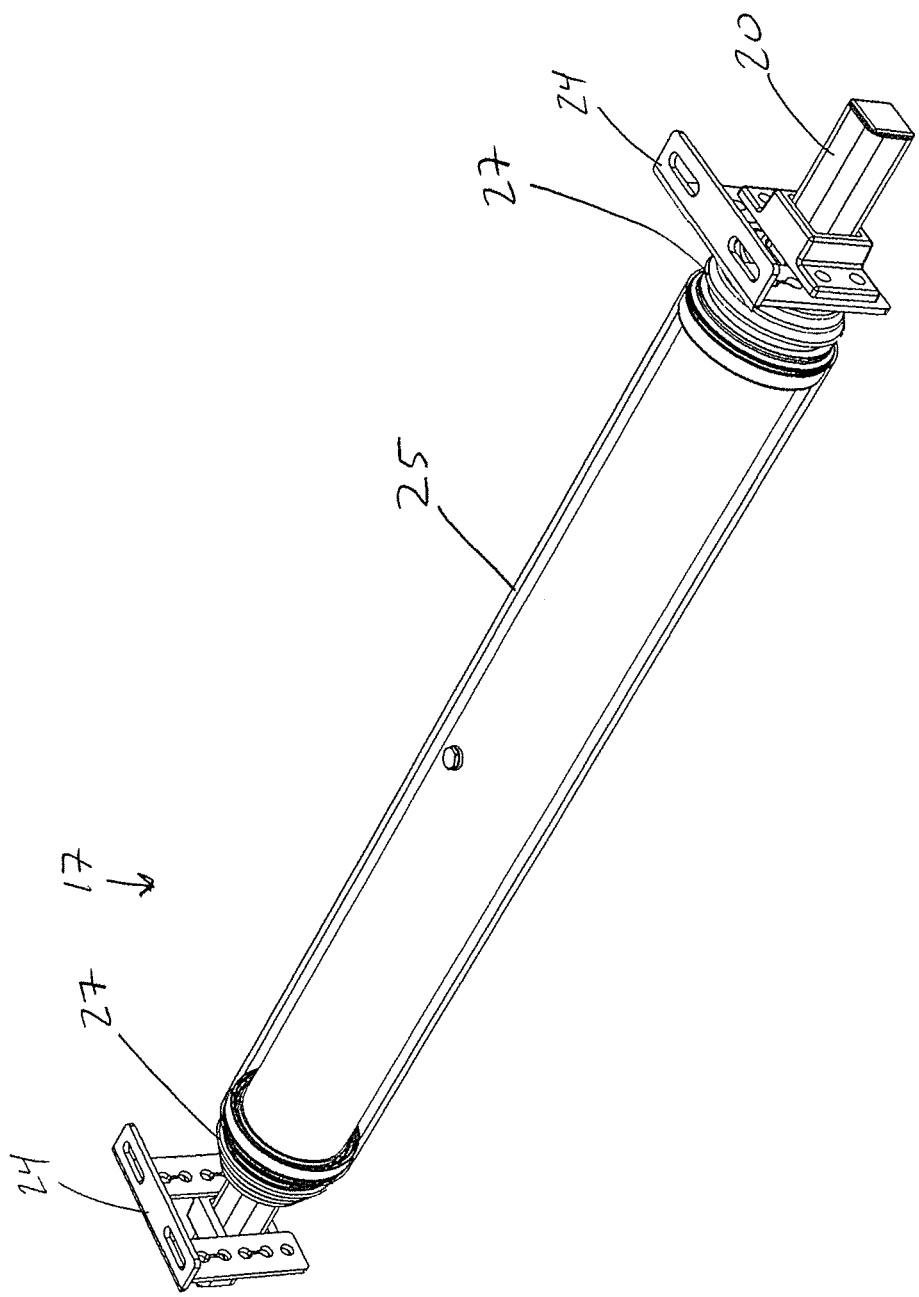
FIG. 7 is a perspective view of the belt tracking apparatus with the outer roller cover removed showing the outer roller tube in ghost so that the structure underneath the outer roller tube, including the inner tube, is visible.

The roller 18 is thus capable of compound rotary motion relative to the conveyor structure, i.e., rotation about its longitudinal axis L, pivoting about a central pivot axis P orthogonal to longitudinal axis L, translation along a support shaft longitudinal axis S, and tilting relative to the support shaft 20. The rotary motion of the roller 18 and the pivoting, translation, and tilting of components of the frame assembly 17 as described hereinafter combine to urge the belt 12 back toward the center to correct a misalignment in the event the belt 12 becomes misaligned to one side as shown in FIGS. 5 and 6. As will be described in further detail below, the self-correcting ability of apparatus 10 can be accomplished without requiring the belt 12 to actively contact sensor rollers to force a change in orientation of the roller 18. This form of belt correction is known as "self-energizing," and preserves the integrity of the belt edges more effectively than the non-self-energizing types of belt trackers that require contact with sensor rollers or the like. Furthermore, the symmetrical nature of the apparatus 10 allows for the apparatus to be used with a belt travelling in both a first longitudinal belt travel direction and a reversed longitudinal direction opposite the first direction.

It should be noted that the term "symmetrical" refers to the general orientation of the components of the apparatus 10 when the apparatus is in a neutral position, and refers to the symmetry on the left and right side of a central longitudinal axis Z that is generally parallel to the direction of belt travel, as well the symmetry on the fore and aft side of a lateral axis X that is generally parallel to the length of the support shaft 20. As will be described in further detail, when the belt 12 becomes misaligned to one side, the roller 18 will pivot about its connection to the support shaft 20, which ultimately causes the roller 18 to translate laterally to the side of the misalignment relative to the support shaft 20 and at the same time causes the corresponding end portion of the roller 18 to tilt upwardly. In such a condition, the overall apparatus 10 will no longer be symmetrical, but will return to its symmetrical orientation after the belt 12 has returned to its intended path of travel with roller 18 in its neutral position. The symmetrical orientation allows for correcting the belt 12 in the same manner regardless of the direction of travel of the belt 12 or the particular side to which the belt 12 becomes misaligned.

Furthermore, the terms "lateral" or "laterally" refer to a lateral direction along the X axis. The terms "fore," "forward," "aft," and "rearward" refer to a longitudinal direction along the Z axis orthogonal to the X axis, and relative to the direction of belt travel, so that forward refers to the direction of belt travel and rearward refers to the direction opposite belt travel. The terms "upward" or "vertical" refer to the vertical Y axis orthogonal to the X and Z axes. Tilting of the roller 18 refers to vertical movement of one end of the roller, but which may also include a lateral component, a rotational component, or a combination thereof.

As shown in FIG. 1, the frame assembly 17 includes the support shaft 20 fixedly mounted to the conveyor frame via conveyor frame mounting brackets 24 and support shaft brackets 26. The conveyor frame mounting brackets 24 have longitudinally extending mounting slots 24a for positional adjustment in the fore and aft directions, and vertically aligned mounting holes 24b for positional adjustment of the belt tracking apparatus 10 in the vertical direction, allowing the apparatus 10 to be mounted in a plurality of orientations relative to the conveyor frame structure with suitable fasteners. The central support shaft 20 extends through a gap between the vertically extending legs 24c of the conveyor frame mounting bracket 24 and is mounted to thereto via the support shaft brackets 26, which are disposed about the support shaft 20 at either end thereof. The lateral position of the roller 18 is adjustable by shifting the support shaft 20 laterally from side to side within the support shaft brackets 26. Once in the correct lateral position, the support shaft 20 is fixed to the support shaft brackets 26 with suitable fasteners.

Figure 8:
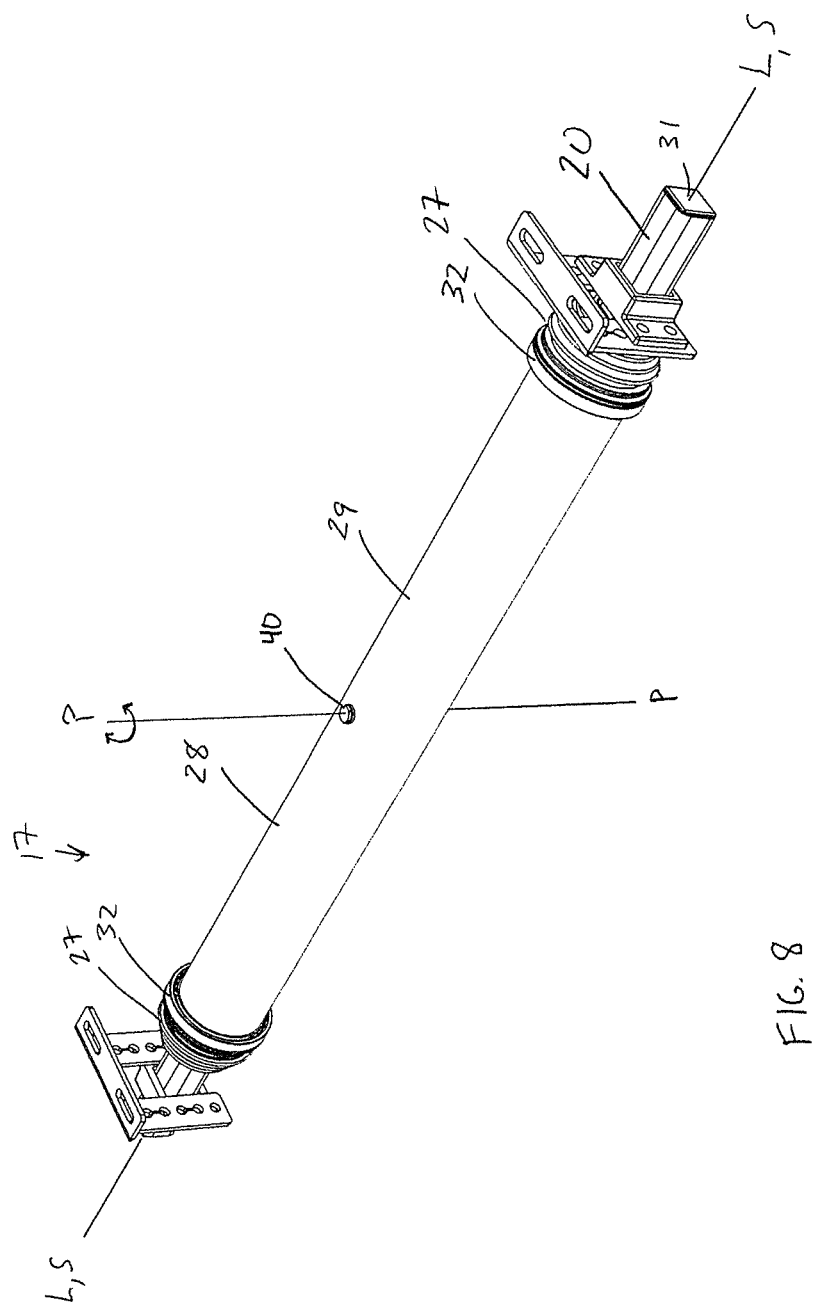
FIG. 8 is a perspective view with the outer roller cover and outer roller tube removed showing the inner tube and roller bearing assemblies mounted at each end.
Figure 9:
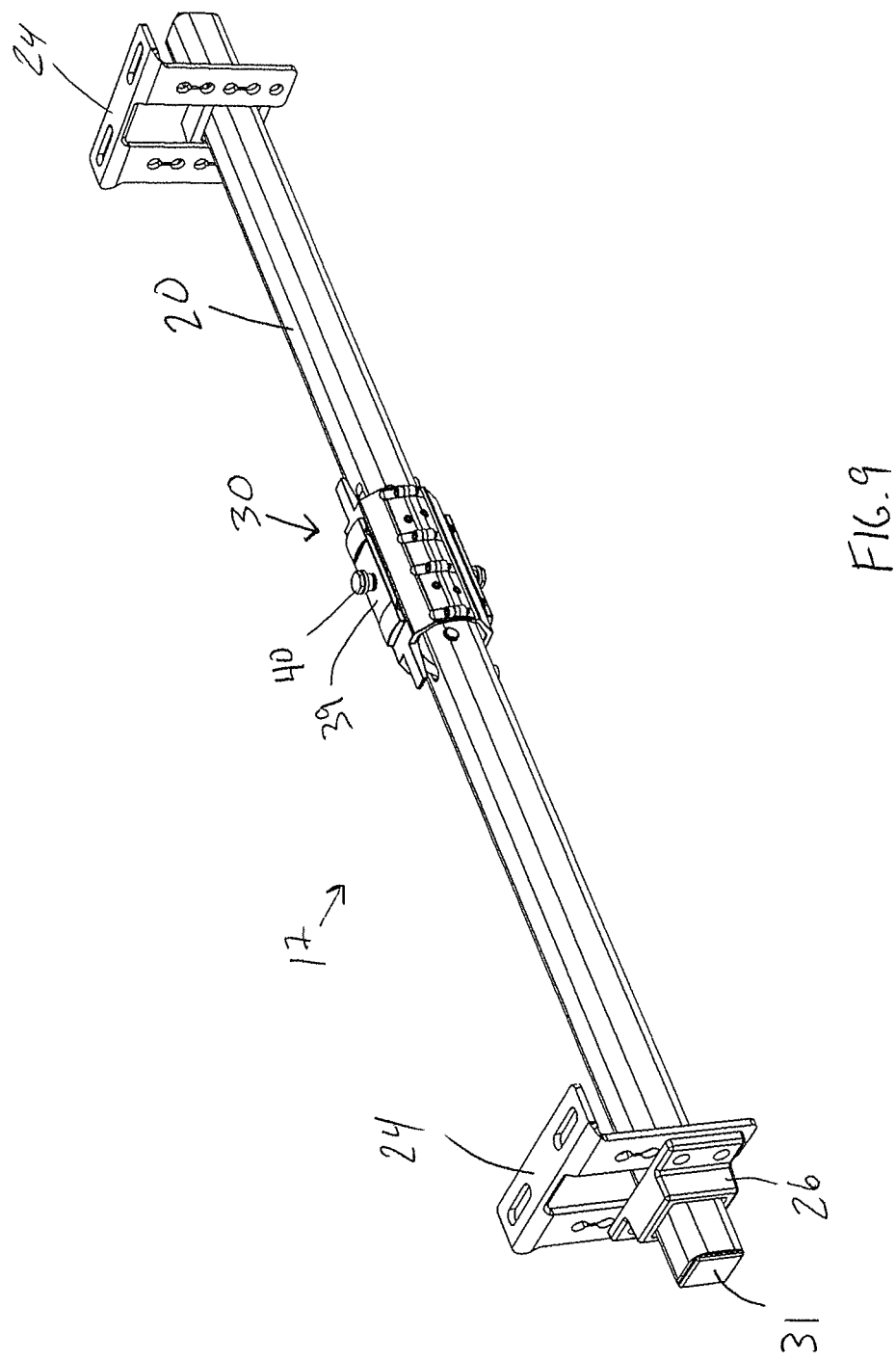
FIG. 9 is perspective view with the outer roller cover, outer roller tube, and inner tube removed to show the tilt coupling mounted on the central support shaft in the neutral position.

As shown in FIGS. 7-10, the frame assembly 17 further includes an inner tube 28 which is movably mounted to the support shaft 20 via a tilt device or coupling 30 of the frame assembly 17, which allows the roller 18 to pivot, translate, and tilt in response to forces transmitted to the roller 18 by a mistracking belt 12, and will be described in greater detail below. As shown in FIG. 8, roller bearing assemblies 32 are mounted about an outer surface 29 of the inner tube 28 at outer lateral ends thereof. The outer tube 25 is rotatably mounted to the inner tube 28 via the roller bearing assemblies 32 such that the outer tube 25, together with the outer cover 19, i.e. the roller 18, may rotate about a common longitudinal axis L about which inner tube 28 and roller 18 extend. Sealing members are provided to protect the moveable members of the frame assembly 17 from debris while allowing the moveable members to shift with respect to the support shaft 20. For example, conical bellows 27 of a flexibly resilient material, e.g. elastomeric or rubber material, are positioned over the ends of the inner tube 28 and over the support shaft 20 to keep debris or other foreign materials from entering the inner tube 28 and fouling the tilt coupling 30 and other internal components, while allowing the moveable components of the frame assembly 17 to shift, pivot, or tilt. The inner tube 28 is provided with a radial groove about its exterior surface adjacent each end for mating with a corresponding internal projection of the inboard end of bellows 27 for securing the bellows about the end of the inner tube 28, while the outboard end of the bellows 27 relies on a friction fit for connection to the support shaft. However, clamping members or other securing means may be used to secure the bellows 27 in place. The conical bellows 27 may expand and contract along the support shaft axis S, as well as flex or shift in any direction to compensate for the movement of the moveable components of the frame assembly 17. The central support shaft 20 also includes end caps 31 to keep debris from entering the shaft 20.

Accordingly, in a preferred form, all of the components of the frame assembly 17, other than the support shaft 20 that extends beyond the ends of the idler roller 18, and the mounting bracketry 24, 26, are located within the idler roller 18. Thus, the moveable components of the frame assembly, i.e., the inner tube 28 and tilt coupling 30, as well as their associated components, including pivot pads 39 and tilt coupling rollers 60, 61, are internal to the roller 18 and are enclosed therein by the conical bellows 27 and by end caps 31 enclosing the central support shaft 20. The moveable frame assembly components are thus protected from fouling by debris (such as the conveyed material), as well as from corrosion and wear caused by the elements when the conveyor is located in an outdoor environment.

Figure 10:
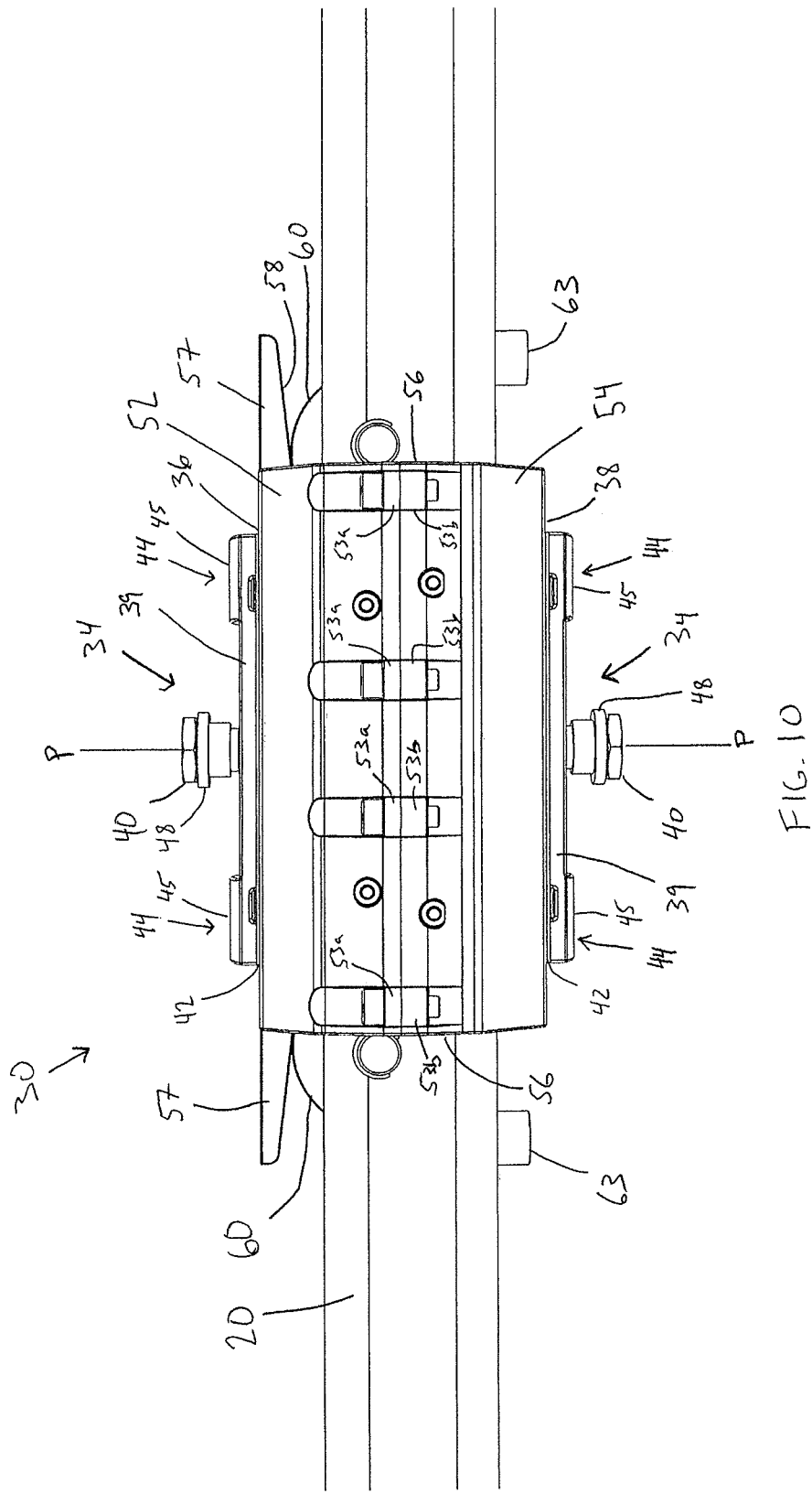
FIG. 10 is a front view of the tilt coupling of FIG. 9 in the neutral position on the central support shaft showing upper and lower pivot pads mounted to the tilt coupling body.

Inner tube 28 does not rotate about its longitudinal axis like the outer tube 25, but is mounted to the tilt coupling 30 via a pivot connection 34 to allow the inner tube 28 rotate with respect to the tilt coupling 30 about pivot axis P, which is orthogonal to longitudinal axis L. With the roller 18 in its neutral or non-tilted orientation, the pivot axis P extends vertically while the longitudinal axis L extends horizontally in the lateral direction across the conveyor belt 12. As shown in FIG. 10, the pivot connection 34 is formed between upper and lower surfaces 36, 38 of the tilt coupling 30 and pivot pads 39 that are pivotally mounted to the tilt coupling outer upper and lower surfaces 36, 38 via pivot bolts 40 that are aligned along pivot axis P. A pivot strip 42 of a thin material, such as UHMW polyethylene, is provided between the pivot pad 39 and the outer surfaces 34, 36 of the tilt coupling to reduce friction therebetween.

Figure 12:
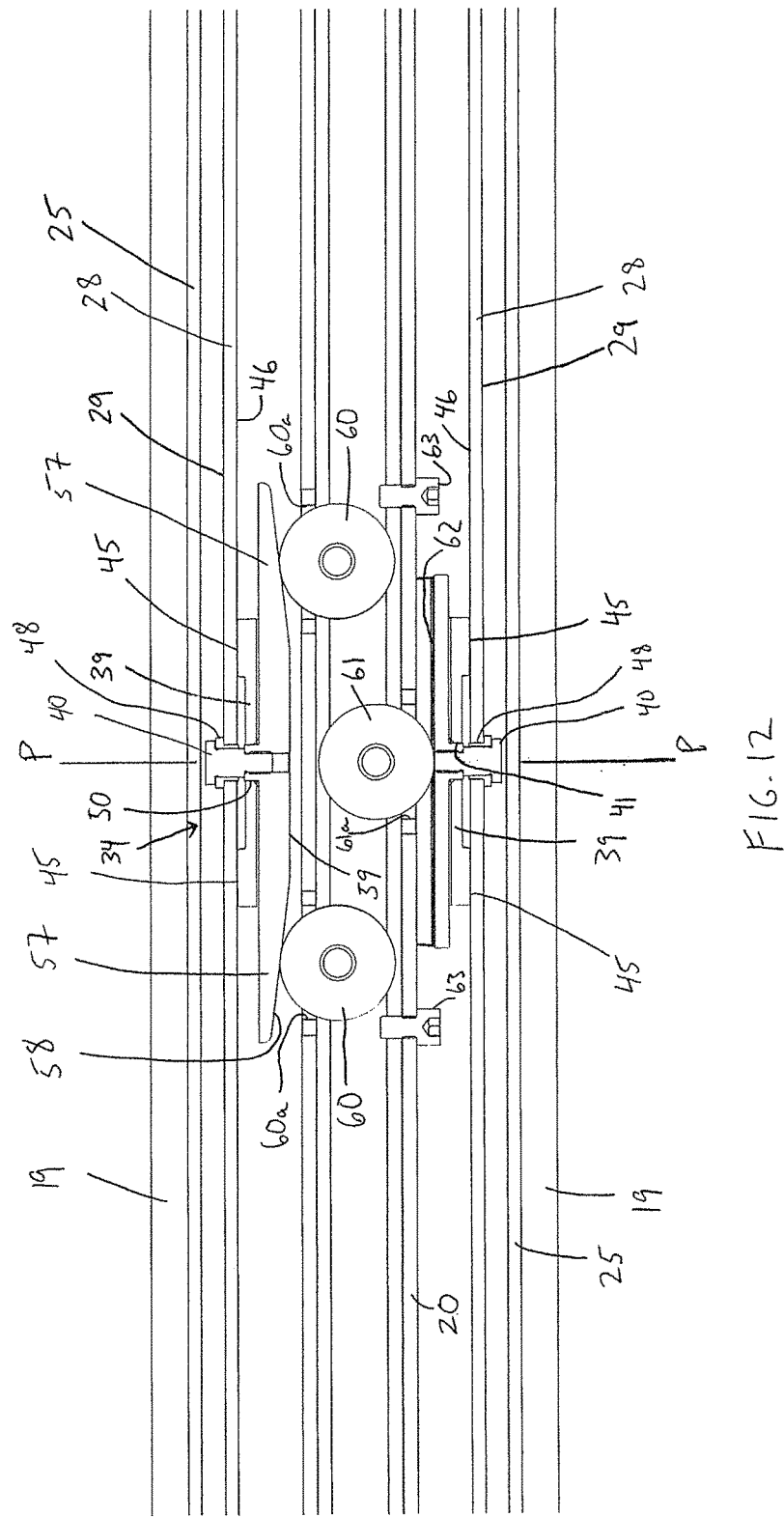
FIG. 12 is a partial, enlarged cross-sectional front view of the belt tracking apparatus of FIG. 1 showing the rollers of the central support shaft engaged with respective roller surfaces of the tilt coupling including the ramped surfaces thereof for permitting axial translation and tilting of the roller.

The pivot pads 39 have a generally rectangular footprint that matches the shape of the upper and lower surfaces 36, 38 of the tilt coupling. The pivot pads 39 include laterally spaced apart inner tube engagement portions 44 for matingly engaging with the inner surface 46 of the inner tube 28. The tube engagement portions 44 extend transversely across each end of the pivot pads 39 and have arcuate engagement surfaces 45 with a radius that substantially matches the inner radius of the inner tube inner surface 46 to mate with the inner tube 28, as shown in FIG. 12. Accordingly, the pivot pads 39 engage with the inner tube inner surface 46 at the four inner tube engagement portions 44. The inner tube 28 is fastened to the tilt coupling 30 via the pivot pads 38 with pivot bolts 40 and pivot bushings 48 so that the inner tube 28 is permitted to pivot about pivot bolts 40 which extend along pivot axis P while also fixing the inner tube 28 against lateral shifting with respect to the tilt coupling 30. The pivot bolts 40 are received in centrally located and axially aligned upper and lower threaded bosses 50 which extend outwardly from the respective upper and lower outer surfaces 36, 38 of tilt coupling and which define pivot axis P. Each pivot pad 39 includes a central aperture 41 through which the threaded boss 50 extends forming a pivotal connection about which the pivot pads 39 rotate or pivot. Accordingly, the inner tube 28 and pivot pads 39 are configured to pivot together about pivot axis P.

The inner tube 28 is permitted to pivot to a limited degree due to the interference between the inner surface 46 of the inner tube 28 and the support shaft 20. Accordingly, the relative sizes of the central support shaft 20 and the length and diameter of the inner tube 28 may affect the maximum amount of pivoting of the apparatus 10. For example, the support shaft 20 may be a 2" square tube and the inner tube 28 may have an outer diameter of approximately 4⅛ inches and a length of between 18-60 inches, depending on the width of the conveyor belt 12. In a currently preferred form, the inner tube 28 is permitted to pivot up to approximately 4.1 degrees in either direction about the pivot axis P, and more preferably up to approximately 2 degrees. In other forms, stops could be provided on the support shaft, inner tube, or tilt coupling to permit the desired amount of pivoting.

Figure 11:
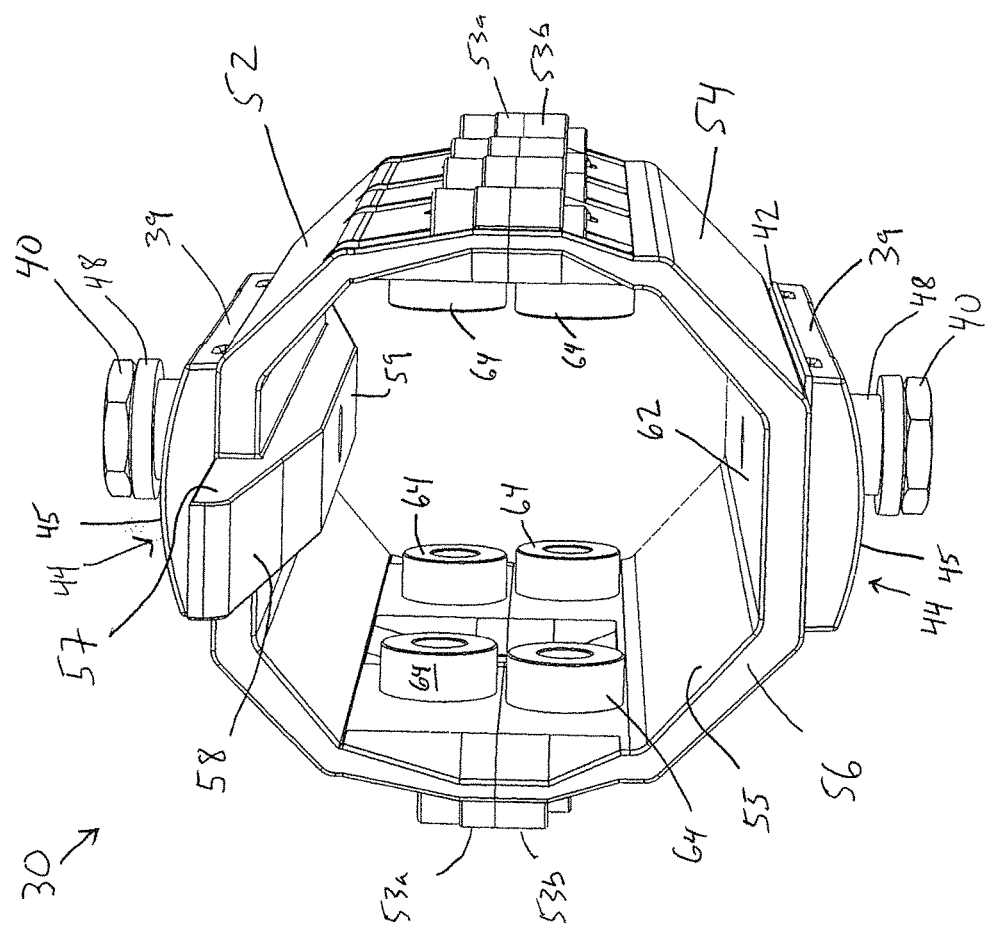
FIG. 11 is an end perspective view of the tilt coupling of FIG. 9 showing the interior of thereof including slide members and the ramped surfaces for tilting the tilt coupling relative to the support shaft.

As best shown in FIGS. 10 and 11, the tilt coupling 30 is formed from separate upper and lower portions 52, 54 that are fastened together by threaded fasteners in corresponding matching bosses 53a, 53b on each of the upstream and downstream sides of each of the coupling portions 52, 54. The upper and lower coupling portions 52, 54 when assembled have a generally octagonal profile so that the coupling 30 is an internal tilt coupling 30 of the frame assembly 17 that fits within the cylindrical interior of the inner tube 28. The internal tilt coupling 30 has a tube-like configuration with an interior passage 55 extending between open ends 56 of the coupling 30 to allow the central support shaft 20 to extend therethrough. Although the tilt coupling 30 could be formed of an integral monolithic material, dividing the coupling into two or more portions, such as separate upper and lower portions allows for ease of manufacturing, as well as installation and maintenance because the coupling 30 can be removed or installed on the support shaft 20 without removing the shaft from the mounting brackets 24, 26. In a preferred form, the tilt coupling portions 52, 54 are formed of cast stainless steel. In another form shown in FIGS. 16-18, the tilt coupling 130 is formed of several machined pieces that are fastened together.

The tilt coupling 30 is configured to both translate laterally as well as tilt with respect to the central support shaft 20. The support shaft 20 includes a plurality of rollers, including two upper rollers 60 and a lower roller 61 for engaging with the tilt coupling 30 along respective smooth rolling surfaces thereof. The support shaft 20 can be hollow so that the rollers 60, 61 are rotatably mounted within the support shaft 20 with their axes of rotation extending orthogonally to the longitudinal axis of the shaft 20. The support shaft 20 includes roller apertures 60a, 61a to allow a portion of the rollers 60, 61 to extend beyond the outer surface of the support shaft 20 as shown in FIG. 12. The lower roller 61 engages with and rolls along a flat interior surface 62 of the lower coupling portion 54. The upper rollers 60 each engage with and roll along corresponding surfaces of the upper coupling portion 52. In particular, the upper coupling portion 52 includes cantilevered ramp portions 57 extending from each end 56 of the upper coupling portion 52, with an inclined ramp surface 58 on an interior side thereof. The inclined ramp surface 58 extends into the interior passage 55 of the tilt coupling 30 to a transition surface 59, which extends between both inclined ramp surfaces 58. The upper rollers 61 are each configured to roll and travel along the respective inclined ramp surface 58 and the transition surface 59. Both ramp surfaces 58 are oriented to have an incline that is at the same angle of approximately 6.7 degrees with respect to the longitudinal axis of the tilt coupling 30 (which axis is parallel to the X axis when in the neutral position), although other configurations could be used.

Figure 13:
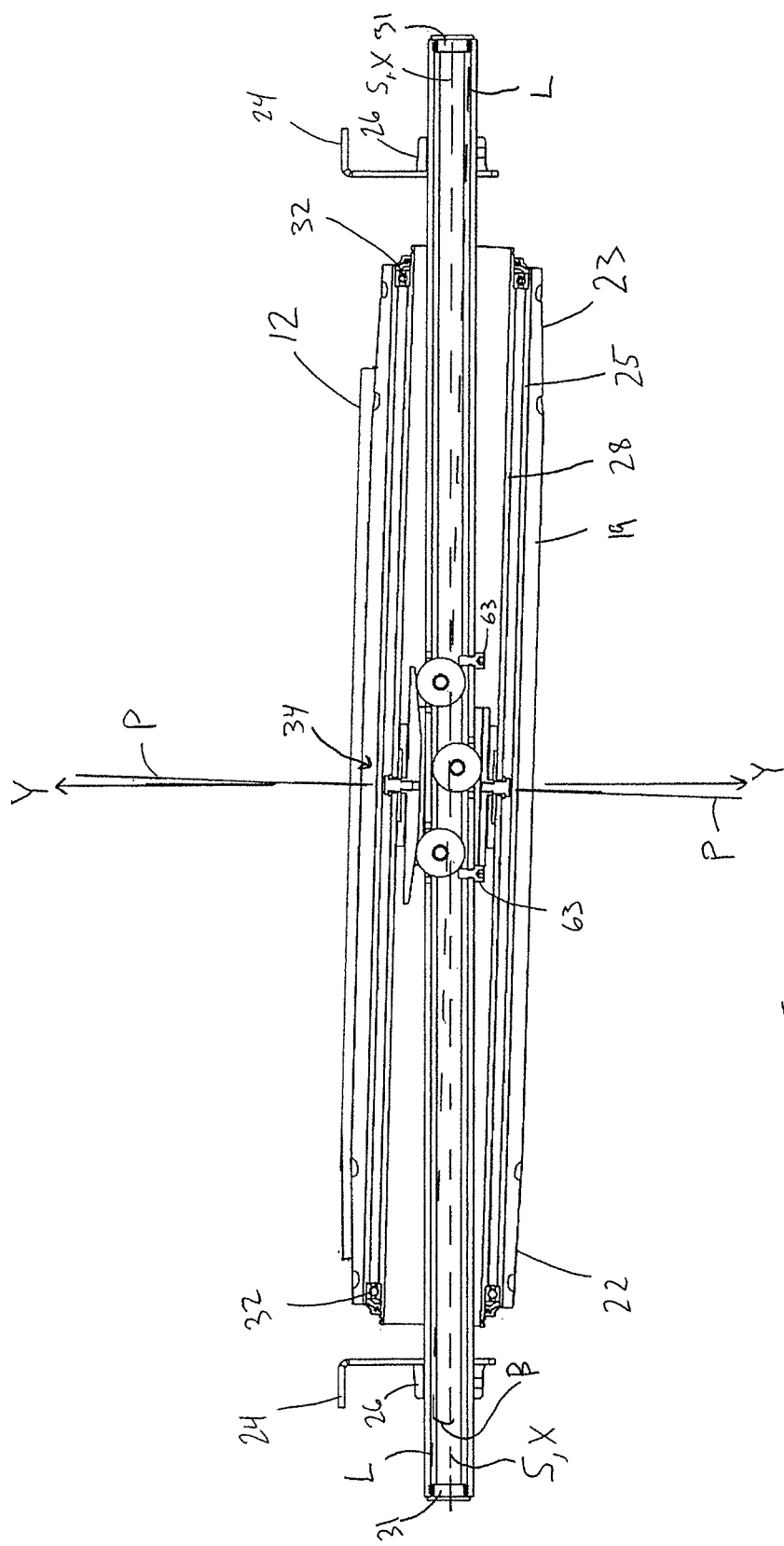
FIG. 13 is a front cross-sectional view of the belt tracking apparatus of FIG. 1 in the shifted and tilted orientation illustrating the relative orientations of the components of the roller and frame assembly.

As shown in FIG. 12, in the neutral position, the lower roller 61 is centered inside the tilt coupling 30, and the upper rollers 60 each engage the inclined ramp surfaces 58 at equal lateral distances from the central pivot axis P. When the belt 12 begins to mistrack and one edge of the belt moves closer to one lateral side of the roller than the other, the roller 18 and inner tube 28 will pivot about pivot axis P, which causes one of the outer ends of the roller 22, 23 to move downstream. The resulting reaction force caused by the belt 12 on the skewed roller 18 causes the tilt coupling 30 to translate along the central shaft longitudinal axis toward the end of the shaft closest to the downstream end 22 of the roller 18. At the same time, due to the inclined ramp surfaces 58 of the tilt coupling 30, the tilt coupling also tilts as one of the upper rollers 60 rolls up the inclined ramp surface towards the transition surface 59 while the other upper roller 60 rolls down the opposite inclined ramp surface 58 toward its outermost extent, as shown in FIG. 13. Preferably, stops 63 are provided on the support shaft 20 to limit the range of travel of the tilt coupling 30 and to keep the rollers 60 from rolling off the ends of the inclined ramp surfaces 58. In other forms, the range of travel of the tilt coupling 30 could be limited by interference between the interior passage 55 of the tilt coupling 30 and the outer surface of the support shaft 20 or by stops engaging with portions of the roller 18 or inner tube 28.

As shown in FIG. 11, the tilt coupling 30 includes guide pads 64 which can have a disc shape and are mounted to the tilt coupling 30 in the interior passage 55 thereof at both the upstream and downstream sides thereof for slidingly engaging the upstream and downstream sides of the support shaft 20 and keeping the tilt coupling 30 aligned with the support shaft 20. In particular, both the upper and lower portions of the tilt coupling 52, 54 include two pairs of opposed guide pads 64.

Having described the structure of the belt tracking apparatus 10 above, the operation of the apparatus 10 is described below.

As previously described, the belt tracking apparatus 10 is mounted to the belt conveyor structure via the conveyor frame mounting brackets 24. The belt 12 is in the form of an endless belt having an upper carry run and a lower return run with the belt tracking apparatus 10 configured to be mounted below the generally flat lower return run of the belt 12. However, the belt tracking apparatus 10 is also configured to be mounted above a lower return run of the belt 12 such that the idler roller 18 engages with the top side of the belt 13, i.e. the side of the belt that does not engage with material to be conveyed. In this mounting configuration, the belt tracking apparatus 10 is rotated 180 degrees about the longitudinal axis S of the support shaft shown in FIG. 8 so that end portion of the idler roller 22, 23 that is pivoted downstream, when tilted, will be shifted generally vertically downwardly, rather than upwardly, i.e., in a transverse direction to the surface of the belt so as to increase the force exerted by the idler roller end portion on the belt 12.

The apparatus 10 supports or engages the belt 12 via contact with the roller 18. When the center of the belt 12 is aligned along the centerline 14, the belt 12 will contact the generally cylindrical central portion 21 of the roller 18 and similar sized-portions of each of the tapered outer end portions 22, 23. As the belt 12 is driven along its path, the contact between the belt 12 and the roller 18 will cause the roller 18 to rotate about its central axis L. More specifically, the roller 18 will rotate about the inner tube 28 via the rotation of the bearings 32 that are disposed about the outer ends of the inner tube 28. While the belt remains generally centered on the centerline 14, the roller 18 will rotate in a generally forward direction, and the longitudinal axis L of the roller 18 will be generally aligned with the longitudinal axis S of the support shaft 20. With the belt 12 centered on the centerline 14, the roller 18 may be referred to as being in the neutral position, which is shown in FIGS. 1-3. In the neutral position, the inner tube 28 is also oriented to extend generally parallel to the support shaft 20. The tilt coupling 30 is generally not translated or tilted relative to the support shaft 20 as long as the apparatus 10 remains in its neutral position.

As shown in FIGS. 4-6, 13, and 14, in the event the belt 12 begins to track off center, or become misaligned, the belt tracking apparatus 10 will operate to urge the belt 12 back toward its centered position as further described below. As the belt tracking apparatus 10 is generally symmetrical, the operation of the correcting features of the apparatus 10 is generally the same whether the belt becomes misaligned to the right or the left. For purposes of illustration, the operation of the apparatus 10 will be described with respect to a lateral misalignment to the left. For reference, a left misalignment refers to the belt 12 becoming misaligned laterally to the left relative to the direction of the belt travel. While the description of the misalignment will be described with respect to a left misalignment, it will be appreciated that a misalignment to the right operates in the same manner. FIGS. 4-6, 13, and 14 illustrate a misalignment of the belt 12 to the left, with the belt tracking apparatus 10 fully shifted, tilted, and rotated to correct the misalignment.

As the belt 12 begins to track off center and to the left, the greater amount of contact between the between the belt 12 and the left tapered outer end portion 22 of the roller 18 creating more friction therebetween will cause the roller 18 to have its left distal end be pulled downstream in the direction of the travel of the belt 12, as described in further detail below. Because the roller's axis of rotation L is now skewed with respect to the downstream direction of travel of the belt 12 to steer the belt 12 back to the right toward its intended path of travel (shown in FIG. 5), a reaction force from the belt 12 is generated to the left and transverse to the direction of belt travel on the roller 18. This causes the roller 18, inner tube 28, and tilt coupling 30 to be translated to the left and the tilt coupling 30 simultaneously to tilt the inner tube 28 and roller 18 upward at the left side against the bottom side of the belt 11.

Figure 14:
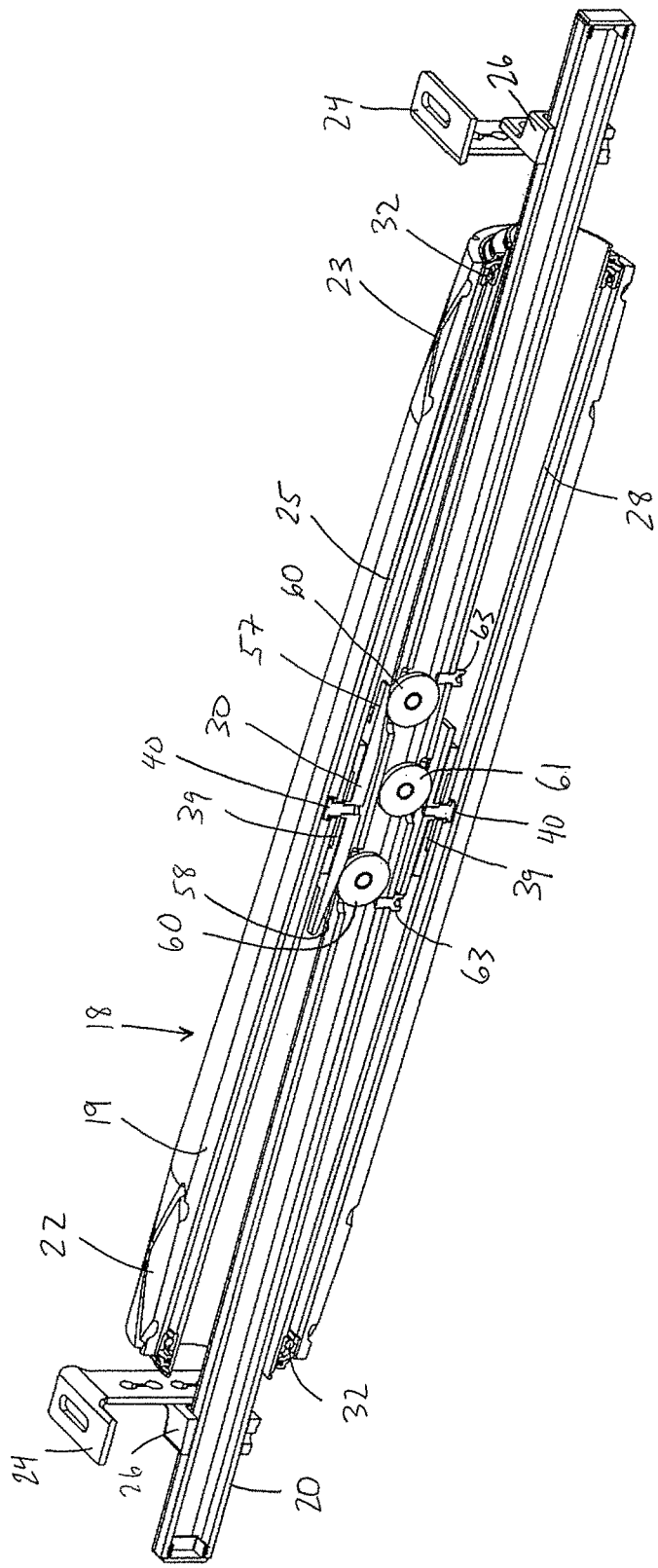
FIG. 14 is a perspective cross-sectional view of belt tracking apparatus as shown in FIG. 13.
Figure 15:
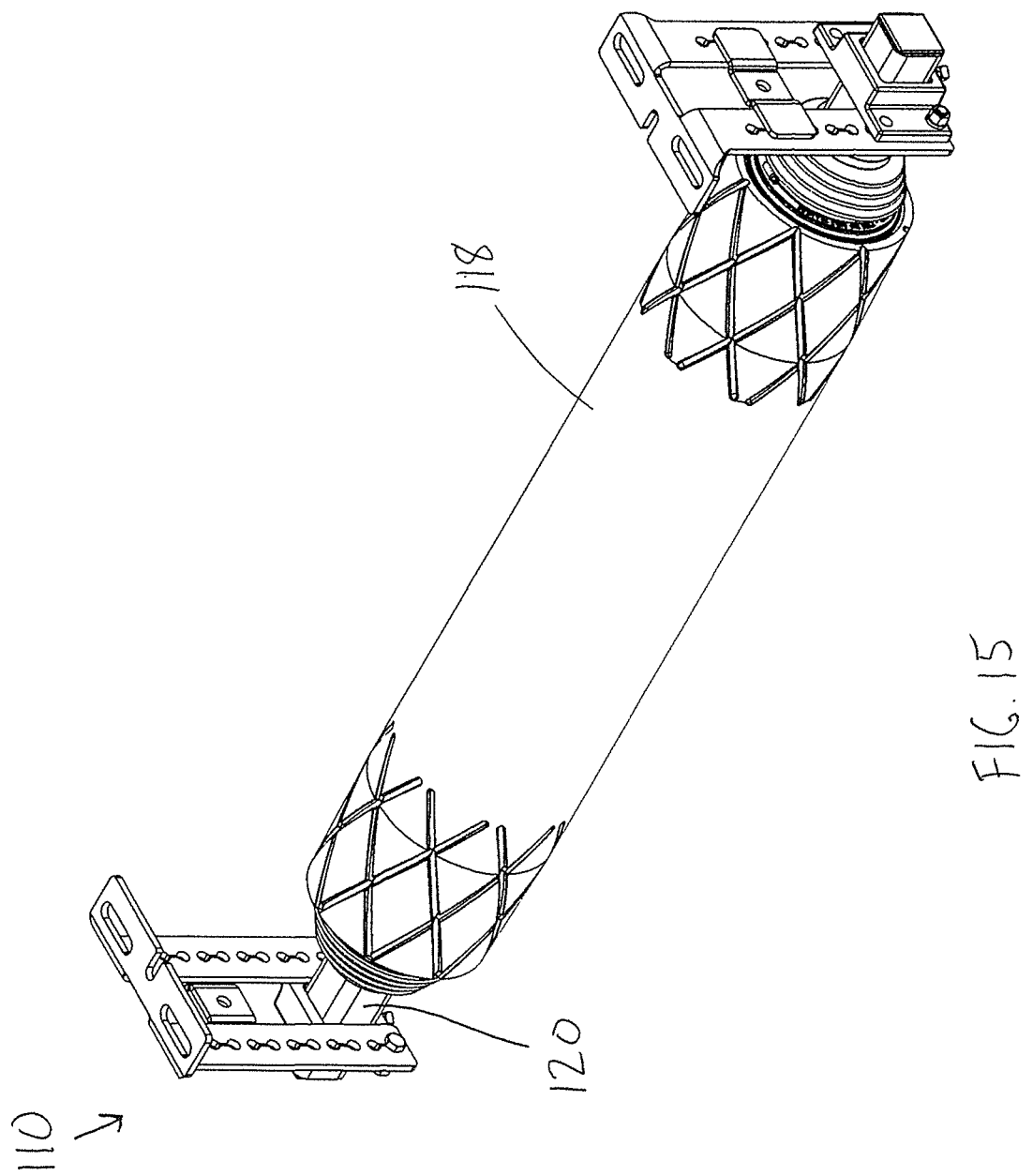
FIG. 15 is a perspective view of an alternate belt tracking apparatus in accordance with the present invention.

As the tilt coupling 30 is urged to the left, it will shift relative to the support shaft 20, which remains fixed to the conveyor structure. More specifically, the tilt coupling 30 will translate along rollers 60, 61 rotatably mounted in the support shaft 20. With the tilt coupling 30 shifting to the left, the upwardly inclined ramp surface 58 on the right side of the tilt coupling 30 will roll down the upper right roller 60 and the upwardly inclined ramp surface 58 on the left side of the tilt coupling will roll up the upper left roller 60, causing the tilt coupling to tilt with its left end higher than the right end. The tilt coupling 30 eventually will abut the left stop 63 mounted to the lower side of the support shaft 20, thereby limiting the amount of tilting and translation of the tilt coupling. However, the degree of tilt of the tilt coupling 30 may also be limited to interference between the interior of the tilt coupling 55 and the outside of the support shaft 20. With the left side of the tilt coupling 30 lifted upward, the right side of the tilt coupling 30 thereby moves downward as shown in FIGS. 13 and 14. Corresponding movements in the inner tube 28 and the roller 18 necessarily result due to the interconnection of the inner tube 28 to the tilt coupling via pivot bolts 40, and the connection of the outer tube 25 of the roller 18 to the inner tube 28 via the bearing assemblies 32.

The slope of the inclined ramp surfaces 58 and amount of lateral travel allowed the tilt coupling 30 along the support shaft 20, along with internal clearances of the tilt coupling 30 and/or the inner tube 28, and the support shaft 20 are factors that will determine the amount of tilting of the tilt coupling 30. For example, a steeper slope of the inclined ramp surfaces 58 would result in a larger degree of tilting. Similarly, extending the inclined ramp surfaces and allowing a larger amount of lateral travel of the tilt coupling 30 along the shaft 20 would also increase the degree of tilting of the tilt coupling 30.

FIG. 13 illustrates the tilt coupling 30 having shifted its maximum amount to the left and its corresponding maximum amount of tilt. In one form, the tilt coupling is permitted to translate approximately ⅞ to 1¼ inches to the left or right along the support shaft 20, corresponding with a maximum angle of tilt β of the coupling of approximately 1.9 degrees and a raising of the corresponding end of the roller 18 of approximately ½ inch above the horizontal neutral position.

With the tilt coupling 30 tilted due to the misalignment of the belt 12 to the left, the downward gravitational force and the tension on the belt 12 caused by the tilting will tend to urge the belt 12 back to the right and toward the center. However, the apparatus 10 will also operate to correct the belt by rotating the roller 18 via the pivotal connection 34 of the inner tube 28 with the tilt coupling 30 so that the distal end of the roller 18 at the side of the misalignment is dragged forward along the direction of the travel of the belt 12, as further described below.

As previously described, when the belt 12 is travelling along its intended path, it is centered on and supported by the roller 18. When the belt 12 becomes misaligned to one side, the misaligned side of the belt 12 will contact more of the tapered outer end portion 22 of the roller 18 at that side, causing the end 22 of the roller 18 to be pulled forward or downstream along the direction of belt travel.

More specifically, as the roller 18 is rotating about its axis L in response to the belt 12 travelling across the top of the belt tracking apparatus 10, the roller 18 has a given rotational velocity. However, the linear (i.e. tangential) velocity of the roller 18 at the cylindrical main portion 21 is greater than the linear velocity at points on the tapered outer end portions 22, 23 due to points on the tapered outer end portions 22, 23 having a decreased radius relative to the cylindrical main portion 21, i.e., points of the roller 18 closer to the center of rotation travel more slowly than points further away from the center, according to the equation v=ω*r, where v is velocity, ω is angular or rotational velocity of the roller, and r is the radius of the roller where the velocity is measured.)

The belt 12 is traveling at a generally constant speed across its width, which generally corresponds to the linear velocity of the cylindrical main portion 21. When the belt 12 becomes misaligned to the left, the belt 12 will still be travelling at its previous linear velocity. However, the points along the tapered outer end portion 22 are travelling at a linear velocity that is less than the belt 12. Thus, when the belt 12 contacts a larger portion of the tapered outer end portion 22 on the left side than the tapered outer end portion 23 on the right side, the faster moving belt 12 will pull the slower moving tapered outer end portion 22 on the left side in the direction of the belt travel. As a result, the outer end 22 of the roller 18 on the left side moves forward or downstream. Because of the pivotal connection 34 between the roller 18 and inner tube 28 with the tilt coupling 30, the roller 18 will thereby rotate about the pivot axis P so that when the left side of the roller 18 moves forward, the right side of the roller 18 moves rearward. This results in the rotational direction of the roller 18 being directed toward the right. The roller 18 will exert a rightward force on the belt 12 in this orientation, thereby steering the belt 12 to the right toward its centered position and, as previously described above, the belt 12 will exert a reaction force to the left transverse to the direction of the travel of the belt 12, which causes the tilt coupling 30 to translate to the left and tilt the left end upwardly, operating to lift the left side of the roller 18. FIG. 5 illustrates the rotation of the roller 18 at an angle α of approximately 2.8 degrees about the vertical Y axis corresponding with a downstream movement of the left end of the roller of approximately ½ inch.

As the belt 12 moves back to the right, the left edge of the belt 12 will move further away from the outer end of the tapered outer end portion 22, and the direction of the belt travel will tend to re-orient the roller 18 so that the roller 18 is rotating in the direction of belt travel and the belt 12 will run along its intended path. In the event the belt 12 shifts too far to the right as it is being corrected from its misalignment to the left, the belt 12 will contact a larger portion of the right tapered outer end portion 23 of the roller 18 than the left tapered outer end portion 22, causing the right side of the roller 18 to be pulled forward, thereby correcting the belt 12 in a similar manner to that described above.

The amount that the roller 18 will be able to rotate about the pivot connection 34 is limited by the clearance of the inner tube 28 with the support shaft 20 extending therethrough. For example, as the roller 18 is pulled forward at the side of the misalignment, the upstream portion of the inner tube 28 at the left lateral side of the apparatus will contact the upstream side of the support shaft 20, while a downstream portion of the inner tube 28 on the right lateral side of the apparatus will contact the downstream side of the support shaft 20, as shown in FIGS. 5 and 14.

Thus, the belt tracking apparatus 10 described above operates to correct a belt misalignment by pivoting, shifting, and tilting the roller 18 via the pivot connection 34 with the tilt coupling 30, and via the translation and tilting of the tilt coupling 30 with respect to the central support shaft 20, to direct the belt 12 back toward center. This combined pivoting, shifting, and tilting of the roller 18 provides a robust solution to conveyor belt systems that become misaligned. The correcting features of tilting and rotating are caused by the contact between the belt 12 and the rollers 18, and do not require the edge of the belt 12 to contact any sensor rollers to cause the correction as in other configurations.

A further benefit of the belt tracking apparatus 10 is achieved by the symmetrical nature of the configuration. Because the apparatus 10 is symmetrical about its center while in the neutral position, the apparatus 10 can be installed on a conveyor belt system and operate on a belt 12 traveling in both a forward and rearward direction. This means that the belt tracking apparatus 10 is reversible. The belt 12 may be run in a first longitudinal belt travel direction to carry its payload in that direction, and may be subsequently reversed to deliver payload in the opposite direction. The belt tracking apparatus 10 may be installed at various points along the conveyor system without regard to the intended direction of the belt 12. The belt tracking apparatus 10 may also be installed to engage the belt 12 from below or from above.

An alternate form of the belt tracking apparatus 110 is shown in FIGS. 15-18, which operates in the same manner to the belt tracking apparatus 10 disclosed in FIGS. 1-14. However, the components of the belt tracking apparatus 110 are sized and configured to accommodate wider belt widths, such as between 42-84 inches. In general, like components and portions of the belt tracking apparatus 110 are labeled with the same number as belt tracking apparatus 10 with the addition of 100 to the number. For the sake of brevity, only the principle distinctions between the tracking apparatuses 10, 110 will be discussed below.

Figure 16:
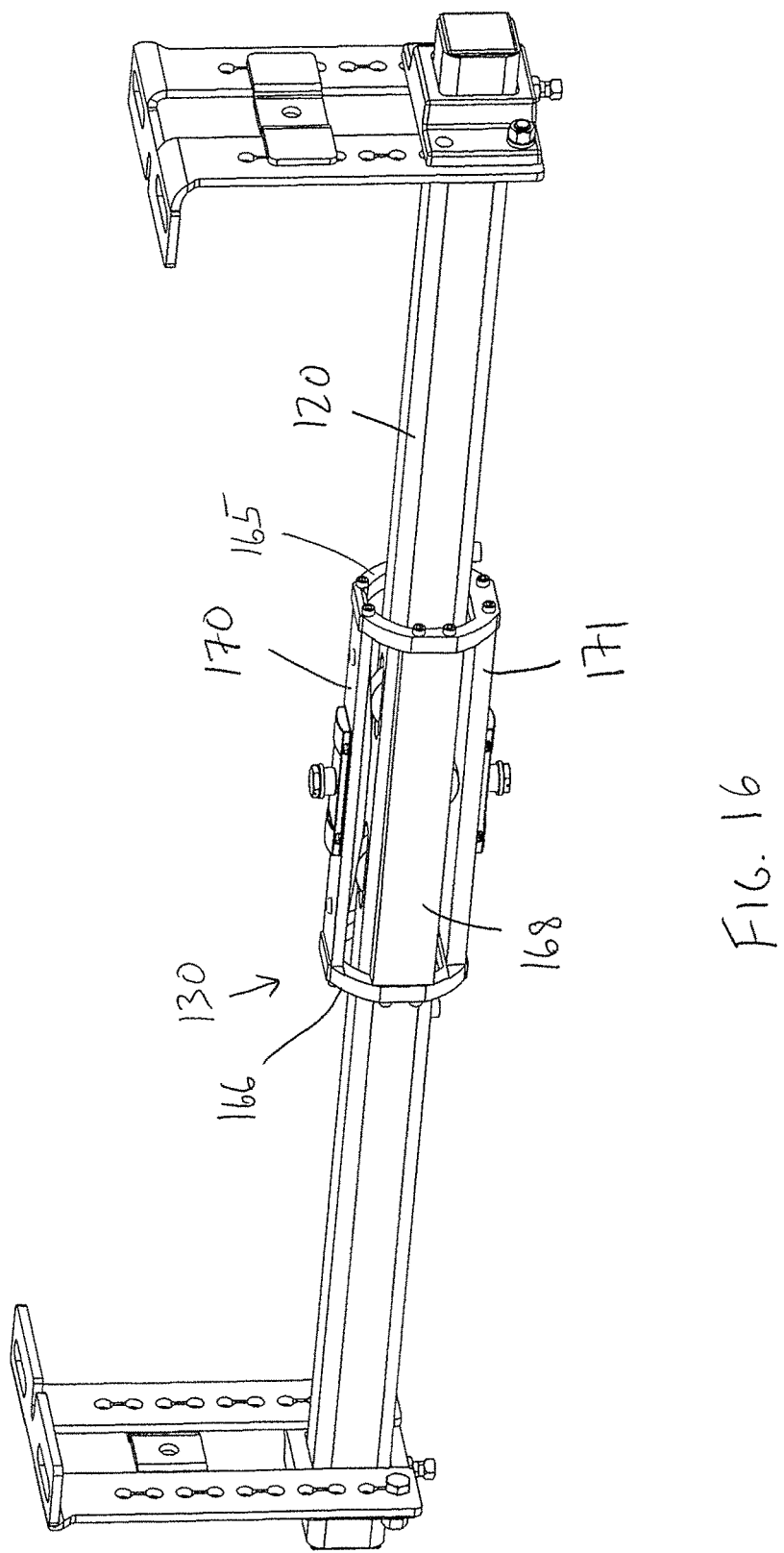
FIG. 16 is perspective view of the belt tracking apparatus of FIG. 15 with the outer roller cover, outer roller tube, and inner tube removed to show the tilt coupling mounted on the central support shaft in the neutral position.
Figure 17:
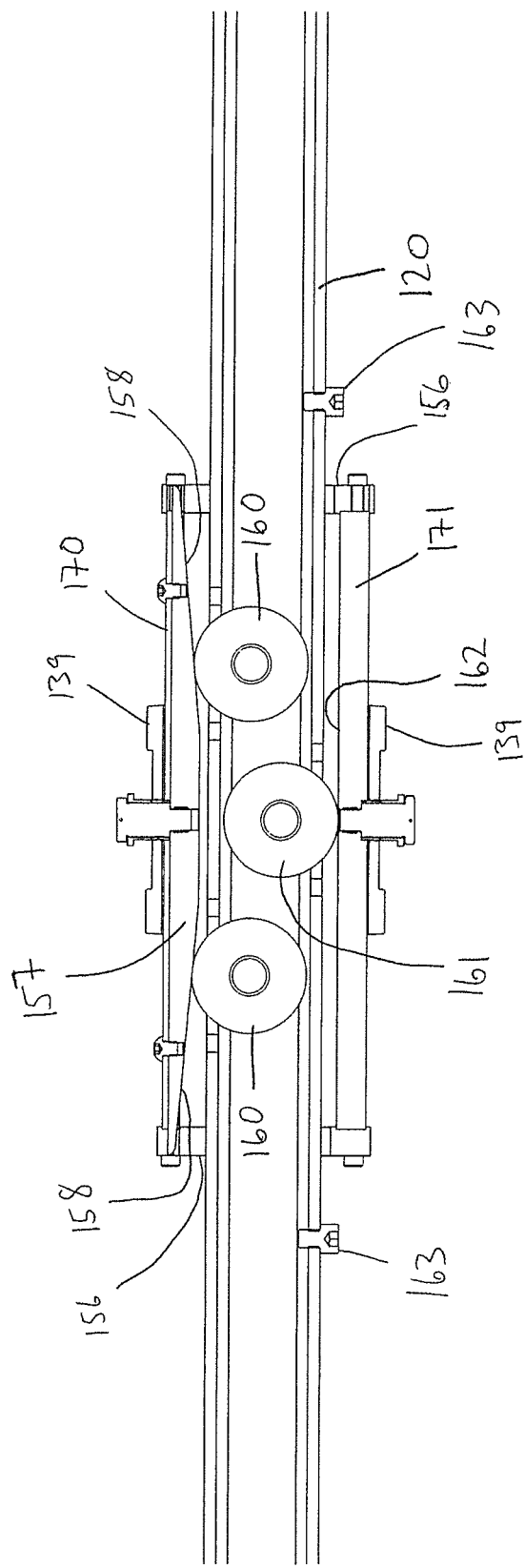
FIG. 17 is a partial, enlarged cross-sectional front view of the belt tracking apparatus of FIG. 15 showing the rollers of the central support shaft engaged with respective roller surfaces of the tilt coupling including the ramped surfaces thereof for permitting axial translation and tilting of the roller.
Figure 18:
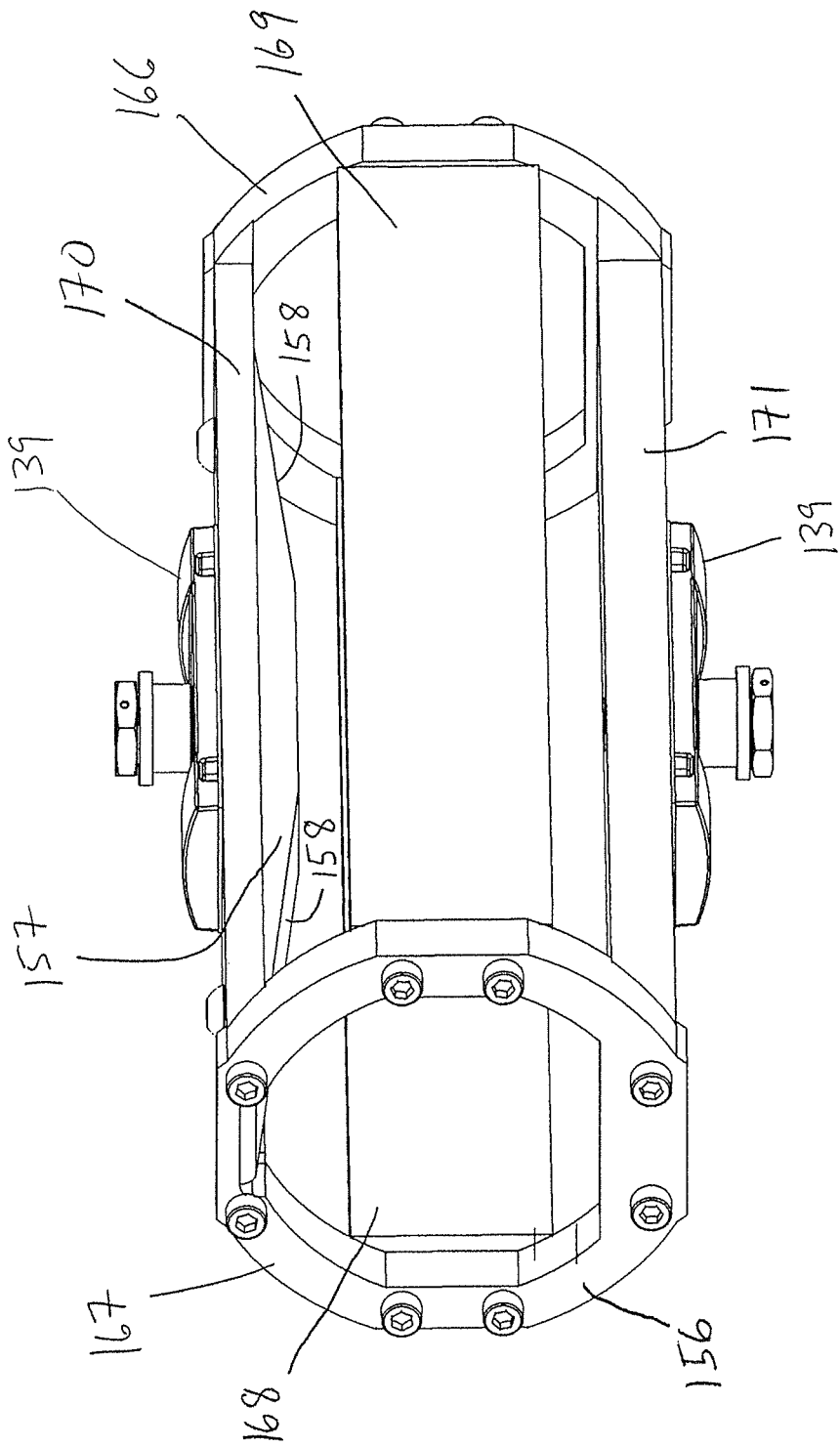
FIG. 18 is a perspective view of the tilt coupling of FIG. 16.

As shown in FIGS. 16-18, one distinction between the belt tracking apparatus 10 and 110 is that the tilt coupling 130 is relatively longer than tilt coupling 30 to accommodate a corresponding wider width of the belt 12, and is constructed from several machined pieces rather than an investment cast design having upper and lower portions 52, 54. In particular, the tilt coupling 130 includes opposing end rings 166, 167 to which fore and aft side brace plates 168, 169 and upper and lower support plates 170, 171 are fastened. The end rings 166, 167 define open ends of the tilt coupling 156 through which the central support shaft 120 extends. As shown in FIG. 17, the tilt coupling 130 includes inclined ramp surfaces 158 disposed on a ramp member 157 that is fastened to the upper support plate 171. In a currently preferred form, the ramp member 157 is made of alloyed steel and the brace plates and support plates 168, 169, 170, 171 are made of mild cold rolled steel. Upper rollers 160 and lower roller 161 are rotatably mounted within the support shaft 120. Each of the upper rollers 160 engages and is operable to roll along one of the ramp surfaces 158, and lower roller 161 engages and is operable to roll along a flat interior surface 162 of the lower support plate 171.

The tilt coupling 130 may be sized to operate with a variety of different length idler rollers 118 corresponding with different belt widths. In particular, the orientation and length of the ramp surfaces 158 shown are long enough to allow the tilt coupling 130 to tilt the idler roller 118 the same amount regardless of the belt width, i.e., such as a belt width within the range of 18 to 84 inches, and more preferably 42-84 inches. However, to accommodate different idler roller sizes, the location of the rollers 160, 161 may be altered. For example, for longer idler rollers, the upper rollers 161 may be shifted outwardly toward either end of the tilt coupling 156 such that the upper rollers 161 will engage the ramp surfaces 158 closer to the outward extents thereof compared with the configuration shown in FIG. 17. Stops 163 are positioned on the central support shaft 120 to limit the amount of lateral translation and tilting of the tilt coupling 130. In the disclosed form, the stops 163 are positioned such that one of the distal ends of the idler roller 118 is raised ¾ of an inch when the tilt coupling 130 is shifted laterally to either side and engages with either stop 163.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A tracking apparatus for urging a mistracking conveyor belt back toward a correct travel path, the tracking apparatus comprising:
an idler roller for engaging a surface of the conveyor belt, the idler roller having opposite end portions and a neutral position when the conveyor belt is traveling along the correct travel path;
a central support shaft configured to operatively mount the idler roller to a conveyor structure with the central support shaft extending along a longitudinal axis transverse to the correct travel path of the conveyor belt;
a tilt coupling operably connected between the central support shaft and the idler roller with the tilt coupling disposed entirely within the idler roller, the tilt coupling being configured to allow the idler roller to pivot with respect to the central support shaft when the conveyor belt is mistracking so that one of the end portions of the idler roller is further downstream from the neutral position thereof and further downstream than the other end portion of the idler roller for directing the conveyor belt back toward the correct travel path, and to allow the idler roller to use a reaction force from the conveyor belt as the conveyor belt is being directed by the pivoted idler roller to actuate the idler roller to be tilted so that the one end portion of the idler roller is shifted in a direction transverse to the surface of the conveyor belt so as to increase the force exerted by the idler roller end portion on the conveyor belt surface for urging the conveyor belt back toward the correct travel path.

2. The tracking apparatus of claim 1, wherein the tilt coupling allows the idler roller to tilt only as a result of the pivoting of the idler roller away from the neutral position thereof.

3. The tracking apparatus of claim 1, wherein the tilt coupling is configured for shifting of the idler roller along the longitudinal axis of the central support shaft.

4. The tracking apparatus of claim 3, wherein the tilt coupling causes the idler roller to tilt when the idler roller is shifted along the longitudinal axis of the central support shaft.

5. The tracking apparatus of claim 1, wherein the tilt coupling has a central throughopening and the central support shaft extends through the central throughopening with the tilt coupling mounted thereto.

6. The tracking apparatus of claim 1, wherein the tilt coupling is shiftably mounted to the central support shaft via one or more rollers.

7. The tracking apparatus of claim 1, wherein the idler roller is configured to urge the mistracking conveyor belt back toward a correct travel path without the use of sensor or edge rollers.

8. The tracking apparatus of claim 1, wherein the idler roller is operably connected to the tilt coupling via a pivot connection having a pivot axis extending through the tilt coupling about which the idler roller rotates.

9. The tracking apparatus of claim 8, wherein the idler roller is connected to the tilt coupling via an inner tube member that is pivotally connected to the tilt coupling via the pivot connection, and the idler roller is rotatably mounted about the inner tube member such that the idler roller is configured for simultaneous rotation and pivoting about the tilt coupling.

10. The tracking apparatus of claim 1, wherein the idler roller is configured to urge the mistracking conveyor belt back toward a correct travel path regardless of whether the conveyor belt is traveling in one direction or an opposite direction.

11. The tracking apparatus of claim 1, wherein the opposite end portions of the idler roller taper down toward a reduced diameter end thereof to cause the idler roller to pivot relative to the central support shaft so that one end portion of the idler roller is further downstream than the other end portion when the conveyor belt mistracks toward the one end for steering the conveyor belt back toward the correct travel path.

12. A bi-directional, self-energizing tracking apparatus capable of redirecting a mistracking conveyor belt back toward a correct travel path whether the conveyor belt is traveling in one direction or in an opposite direction, the tracking apparatus comprising:
an idler roller that engages a surface of the conveyor belt;
a frame assembly for operatively mounting the idler roller to conveyor structure;
a shiftable connection of the frame assembly for operably connecting the idler roller to the frame assembly and being internal to the idler roller for shifting the idler roller relative to the frame assembly in response to the mistracking conveyor belt, the shiftable connection being configured to allow the idler roller to pivot about a pivot axis such that an end of the idler roller is shifted downstream relative to a neutral position thereof corresponding to the conveyor belt traveling along a correct travel path, and allow the idler roller to tilt such that the downstream end of the idler roller is shifted in a direction transverse to the surface of the conveyor belt so as to increase the force exerted by the idler roller end on the conveyor belt surface for guiding the mistracking conveyor belt back toward a correct travel path.

13. The tracking apparatus of claim 12, wherein the shiftable connection is configured to allow the idler roller to translate along a translation axis transverse to the one conveyor belt direction.

14. The tracking apparatus of claim 13, wherein the shiftable connection is configured to tilt the idler roller when the idler roller translates along the translation axis.

15. The tracking apparatus of claim 12, wherein the shiftable connection is configured to pivot the idler roller about the pivot axis prior to tilting the idler roller such that in operation the idler roller only tilts when the idler roller is pivoted.

16. The tracking apparatus of claim 12, wherein the shiftable connection includes a tilt coupling that is shiftably mounted about a central support shaft of the frame assembly for allowing the idler roller to tilt with respect to the central support shaft.

17. The tracking apparatus of claim 16, wherein the shiftable connection includes an inner tube member that is pivotally mounted to the tilt coupling, and wherein the idler roller is rotatably mounted about the inner tube member such that the idler roller is configured to simultaneously rotate and pivot about the tilt coupling.

18. The tracking apparatus of claim 16, wherein the tilt coupling is configured to translate laterally along the central support shaft and the tilt coupling and the central support shaft have stops therebetween to limit lateral translation and tilting of tilt coupling relative to the central support shaft by a predetermined amount.

19. The tracking apparatus of claim 12, further comprising sealing members at either end of the idler roller for keeping debris or foreign materials from fouling the shiftable connection disposed within the idler roller.

20. A method for urging a mistracking conveyor belt back toward a correct travel path, the method comprising;
    mounting an idler roller disposed about a central support shaft extending through the idler roller to conveyor structure such that the idler roller is operably supported by the central support shaft and is configured to rotate about the central support shaft, as well as pivot and tilt with respect thereto, the idler roller having outer end portions adjacent outer side surface portions of the conveyor belt;
    pivoting the idler roller with respect to the central support shaft so that one end portion of the idler roller is further downstream than the other end portion in response to conveyor belt mistracking toward the one end portion of the idler roller;
    steering the conveyor belt back toward the correct travel path with the pivoted idler roller;
    causing the idler roller to undergo a tilting action with respect to the central support shaft so that the idler roller end portion that has been shifted downstream shifts in a direction transverse to the corresponding outer side surface portion of the conveyor belt so as to increase the force exerted by the idler roller end portion on the corresponding outer side surface portion of the conveyor belt in response to a reaction force exerted by the conveyor belt being steered by the idler roller; and
    urging the conveyor belt to generally shift in a lateral direction away from the transversely shifted downstream idler roller end portion back toward the correct travel path due to the tilting of the idler roller.

21. The method of claim 20 wherein mounting the idler roller includes securing the central support shaft to the conveyor structure such that the central support shaft is fixed to the conveyor structure so as to remain stationary.

22. The method of claim 20 wherein mounting the idler roller includes securing the central support shaft to the conveyor structure with the central support shaft between an upper carry run and a lower return run of the conveyor belt.

23. The method of claim 20, further comprising urging the conveyor belt to generally shift in a lateral direction away from the transversely shifted downstream idler roller end portion back toward the correct travel path due to the tilting of the idler roller with the belt traveling in a second direction opposite from a first direction such that the idler roller urges a mistracking conveyor belt back toward a correct travel path regardless of whether the belt is traveling in the first or second directions.

24. The method of claim 20, wherein causing the idler roller to undergo a tilting action includes shifting the idler roller along a longitudinal axis of the central support shaft.

* * * * *